US011764697B2

(12) United States Patent
Zhao et al.

(10) Patent No.: US 11,764,697 B2
(45) Date of Patent: Sep. 19, 2023

(54) SYSTEMS AND METHODS FOR CONTROLLING SYNCHRONOUS RECTIFICATION

(71) Applicant: ON-BRIGHT ELECTRONICS (SHANGHAI) CO., LTD., Shanghai (CN)

(72) Inventors: Chunsheng Zhao, Shanghai (CN); Yaming Cao, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 144 days.

(21) Appl. No.: 17/152,418

(22) Filed: Jan. 19, 2021

(65) Prior Publication Data

US 2021/0226540 A1    Jul. 22, 2021

(30) Foreign Application Priority Data

Jan. 20, 2020   (CN) .......................... 202010063404.0

(51) Int. Cl.
*H02M 3/335*    (2006.01)
(52) U.S. Cl.
CPC .... *H02M 3/33592* (2013.01); *H02M 3/33515* (2013.01)
(58) Field of Classification Search
CPC .................. H02M 3/33592; H02M 3/33515
See application file for complete search history.

(56) References Cited

U.S. PATENT DOCUMENTS 6,069,804 A    5/2000  Ingman et al.
6,091,233 A    7/2000  Hwang et al.
(Continued)

FOREIGN PATENT DOCUMENTS

CN        2529442 Y     1/2003
CN      101106333 A     1/2008
(Continued)

OTHER PUBLICATIONS

Chinese Patent Office, Office Action dated Jan. 26, 2014, in Application No. 201210118202.7.
(Continued)

*Primary Examiner* — Kyle J Moody
(74) *Attorney, Agent, or Firm* — Faegre Drinker Biddle & Reath

(57) ABSTRACT

System and method for controlling synchronous rectification. For example, the system for controlling synchronous rectification includes: a switch including a first switch terminal configured to receive a first voltage, the switch further including a second switch terminal and being configured to be closed or opened by a control signal; a voltage generator configured to receive a second voltage from the second switch terminal and generate a third voltage based at least in part on the second voltage; a filter circuit including a resistor and a capacitor, the filter circuit being configured to receive the second voltage from the second switch terminal and generate a fourth voltage based at least in part on the second voltage; a first comparator configured to receive the third voltage and the fourth voltage and generate a first comparison signal based at least in part on the third voltage and the four voltage.

24 Claims, 17 Drawing Sheets

(56) References Cited

U.S. PATENT DOCUMENTS

| | | |
|---|---|---|
| 6,198,638 B1 | 3/2001 | Lee |
| 6,972,969 B1 | 12/2005 | Shteynberg et al. |
| 7,173,835 B1 | 2/2007 | Yang |
| 7,447,049 B2 | 11/2008 | Garner et al. |
| 7,768,801 B2 | 8/2010 | Usui et al. |
| 7,791,903 B2 | 9/2010 | Zhang et al. |
| 7,826,237 B2 | 11/2010 | Zhang et al. |
| 7,869,231 B2 | 1/2011 | Cohen |
| 7,952,894 B2 | 5/2011 | Lin et al. |
| 8,102,676 B2 | 1/2012 | Huynh et al. |
| 8,134,851 B2 | 3/2012 | Soldano et al. |
| 8,391,028 B2 | 3/2013 | Yeh |
| 8,542,507 B2 | 9/2013 | Hsu et al. |
| 8,570,772 B2 | 10/2013 | Morris et al. |
| 8,953,342 B2 | 2/2015 | Fang |
| 9,413,246 B2 | 8/2016 | Luo et al. |
| 9,595,874 B2 | 3/2017 | Cao et al. |
| 9,602,006 B2 | 3/2017 | Fahlenkamp |
| 9,608,532 B2 | 3/2017 | Wong et al. |
| 9,787,198 B1 | 10/2017 | Cao et al. |
| 10,003,268 B2 * | 6/2018 | Fang ................. H02M 3/33507 |
| 10,063,153 B2 | 8/2018 | Fang |
| 10,122,284 B2 | 11/2018 | Fang |
| 10,148,189 B2 | 12/2018 | Cao et al. |
| 10,158,298 B2 | 12/2018 | Lin et al. |
| 10,193,451 B2 | 1/2019 | Luo et al. |
| 10,270,354 B1 | 4/2019 | Lu et al. |
| 10,411,604 B2 | 9/2019 | Cao et al. |
| 10,411,605 B2 | 9/2019 | Cao et al. |
| 10,432,096 B2 * | 10/2019 | Fang ................. H02M 3/33515 |
| 10,483,856 B2 | 11/2019 | Cao et al. |
| 10,505,442 B2 | 12/2019 | Wong et al. |
| 10,516,341 B1 | 12/2019 | Fu et al. |
| 10,608,544 B2 | 3/2020 | Moon et al. |
| 10,622,902 B2 | 4/2020 | Cao et al. |
| 10,622,903 B2 | 4/2020 | Cao et al. |
| 10,651,747 B2 | 5/2020 | Cao et al. |
| 10,756,640 B1 | 8/2020 | Radic et al. |
| 10,819,211 B2 | 10/2020 | Yang et al. |
| 11,581,815 B2 | 2/2023 | Cao et al. |
| 11,588,405 B2 | 2/2023 | Cao et al. |
| 2002/0114172 A1 | 8/2002 | Webb et al. |
| 2003/0117119 A1 | 6/2003 | Bridge |
| 2004/0125621 A1 | 7/2004 | Yang et al. |
| 2005/0024897 A1 | 2/2005 | Yang et al. |
| 2005/0057951 A1 | 3/2005 | Berghegger |
| 2006/0018135 A1 | 1/2006 | Yang et al. |
| 2007/0014133 A1 | 1/2007 | Shao et al. |
| 2007/0139095 A1 | 6/2007 | Fang et al. |
| 2008/0037302 A1 | 2/2008 | Yang et al. |
| 2009/0168464 A1 | 7/2009 | Lin et al. |
| 2009/0257644 A1 | 10/2009 | Dodzin et al. |
| 2009/0322300 A1 | 12/2009 | Melanson et al. |
| 2010/0027298 A1 | 2/2010 | Cohen |
| 2010/0128501 A1 | 5/2010 | Huang et al. |
| 2010/0219802 A1 | 9/2010 | Lin et al. |
| 2011/0002145 A1 | 1/2011 | Halberstadt |
| 2011/0019446 A1 | 1/2011 | Wu et al. |
| 2011/0044076 A1 | 2/2011 | Zhang et al. |
| 2011/0169463 A1 | 7/2011 | Yang et al. |
| 2011/0305055 A1 | 12/2011 | Hsu et al. |
| 2012/0032708 A1 | 2/2012 | Coleman |
| 2012/0075891 A1 | 3/2012 | Zhang et al. |
| 2012/0300520 A1 | 11/2012 | Ren et al. |
| 2013/0033236 A1 | 2/2013 | Li et al. |
| 2013/0235620 A1 | 9/2013 | Morris et al. |
| 2013/0258723 A1 | 10/2013 | Fang et al. |
| 2013/0272036 A1 | 10/2013 | Fang |
| 2014/0021786 A1 | 1/2014 | Fang |
| 2014/0204625 A1 | 7/2014 | Liu et al. |
| 2014/0218976 A1 | 8/2014 | Luo et al. |
| 2014/0368254 A1 | 12/2014 | Lee et al. |
| 2015/0070944 A1 | 3/2015 | Fang |
| 2015/0229223 A1 | 8/2015 | Cao et al. |
| 2015/0249380 A1 | 9/2015 | Hayakawa et al. |
| 2015/0280584 A1 | 10/2015 | Gong et al. |
| 2016/0149499 A1 | 5/2016 | Fang |
| 2016/0322909 A1 | 11/2016 | Cao et al. |
| 2017/0005578 A1 | 1/2017 | Luo et al. |
| 2017/0126138 A1 | 5/2017 | Cao et al. |
| 2017/0155322 A1 | 6/2017 | Zhang et al. |
| 2017/0222569 A1 | 8/2017 | Choi et al. |
| 2017/0264287 A1 | 9/2017 | Osanai |
| 2017/0353099 A1 | 12/2017 | Yang et al. |
| 2018/0013352 A1 | 1/2018 | Cao et al. |
| 2018/0034377 A1 | 2/2018 | Cao et al. |
| 2018/0076720 A1 | 3/2018 | Cao et al. |
| 2018/0248488 A1 | 8/2018 | Cao et al. |
| 2019/0068073 A1 | 2/2019 | Cao et al. |
| 2019/0393767 A1 | 12/2019 | Hwang et al. |
| 2019/0393790 A1 | 12/2019 | Cao et al. |
| 2020/0161985 A1 | 5/2020 | Li et al. |
| 2020/0280259 A1 | 9/2020 | Cao et al. |
| 2020/0280260 A1 | 9/2020 | Cao et al. |
| 2020/0336071 A1 | 10/2020 | Iorio et al. |
| 2020/0343810 A1 | 10/2020 | Xu et al. |
| 2021/0376746 A1 | 12/2021 | Cao et al. |
| 2022/0294355 A1 | 9/2022 | Lin et al. |
| 2022/0329171 A1 | 10/2022 | Zhao |
| 2023/0010393 A1 | 1/2023 | Zhao |
| 2023/0033953 A1 | 2/2023 | Cao |

FOREIGN PATENT DOCUMENTS

| | | |
|---|---|---|
| CN | 101188384 A | 5/2008 |
| CN | 101272089 A | 9/2008 |
| CN | 101378232 A | 3/2009 |
| CN | 201238265 Y | 5/2009 |
| CN | 201435677 Y | 3/2010 |
| CN | 101841247 A | 9/2010 |
| CN | 102017376 A | 4/2011 |
| CN | 102104338 A | 6/2011 |
| CN | 102217181 | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 102882377 A | 1/2013 |
| CN | 103296867 A | 9/2013 |
| CN | 103501112 A | 1/2014 |
| CN | 103728572 A | 4/2014 |
| CN | 103887980 A | 6/2014 |
| CN | 102185501 B | 9/2014 |
| CN | 104300793 A | 1/2015 |
| CN | 104393763 A | 3/2015 |
| CN | 103378751 A | 4/2015 |
| CN | 105322800 A | 2/2016 |
| CN | 105356727 A | 2/2016 |
| CN | 106026703 A | 5/2016 |
| CN | 107104598 A | 8/2017 |
| CN | 206379873 U | 8/2017 |
| CN | 107342691 A | 11/2017 |
| CN | 107579670 A | 1/2018 |
| CN | 107872158 A | 4/2018 |
| CN | 107979289 A | 5/2018 |
| CN | 108566104 A | 9/2018 |
| CN | 105846695 B | 11/2018 |
| CN | 108736749 A | 11/2018 |
| CN | 108880296 A | 11/2018 |
| CN | 109274272 A | 1/2019 |
| CN | 106130349 B | 3/2019 |
| CN | 109802559 A | 5/2019 |
| CN | 110620514 A | 12/2019 |
| CN | 209913730 U | 1/2020 |
| CN | 110896283 A | 3/2020 |
| CN | 110995013 A | 4/2020 |
| CN | 111146961 A | 5/2020 |
| CN | 111193407 A | 5/2020 |
| CN | 111404403 A | 7/2020 |
| CN | 211296573 U | 8/2020 |
| CN | 111697838 A | 9/2020 |
| CN | 111865095 A | 10/2020 |
| CN | 112688570 A | 4/2021 |
| CN | 112803773 A | 5/2021 |

(56) References Cited

FOREIGN PATENT DOCUMENTS

| | | |
|---|---|---|
| EP | 2525480 A1 | 11/2012 |
| JP | 2000-014136 A | 1/2000 |
| JP | 2007-28894 A | 2/2007 |
| JP | 2009-124296 A | 6/2009 |
| JP | 2009-261042 A | 11/2009 |
| JP | 2009-278717 A | 11/2009 |
| JP | 5285602 B2 | 9/2013 |
| JP | 6351787 B2 | 7/2018 |
| TW | 200717978 A | 5/2007 |
| TW | I 366335 | 6/2012 |
| TW | 201234854 A | 8/2012 |
| TW | I 401866 | 7/2013 |
| TW | I 436571 | 5/2014 |
| TW | I 448064 | 8/2014 |
| TW | 201521347 | 6/2015 |
| TW | I 489751 | 6/2015 |
| TW | 201537882 | 10/2015 |
| TW | I 509971 | 11/2015 |
| TW | 201707361 | 2/2017 |
| TW | I 625924 B | 6/2018 |
| TW | I 635699 | 9/2018 |
| TW | 201919322 A | 5/2019 |
| TW | 201933752 A | 8/2019 |
| TW | 201937834 A | 9/2019 |
| TW | 202002494 A | 1/2020 |
| TW | 202019066 A | 5/2020 |
| TW | 202110051 A | 3/2021 |
| TW | 202114333 A | 4/2021 |

OTHER PUBLICATIONS

Chinese Patent Office, Office Action dated Oct. 28, 2015, in Application No. 201410093010.4.
Chinese Patent Office, Office Action dated May 25, 2016, in Application No. 201410729533.3.
Chinese Patent Office, Office Action dated Dec. 20, 2017, in Application No. 201610345719.8.
Chinese Patent Office, Office Action dated Sep. 4, 2018, in Application No. 201710102817.3.
Chinese Patent Office, Office Action dated Nov. 9, 2018, in Application No. 201710534527.6.
Chinese Patent Office, Office Action dated Mar. 19, 2021, in Application No. 202010063404.0.
Li, Longwen, "Newest Switch Power Supply Design Procedures and Steps," Chapter 8, Section 4, pp. 455-458, 2008.
Liu, Shengli, "Practical New Technology of High Frequency Switch Power Supply," Chapter 6, pp. 100-117, 2006.
Taiwan Intellectual Property Office, Office Action dated Oct. 9, 2014, in Application No. 101118860.
Taiwan Intellectual Property Office, Office Action dated Dec. 2, 2016, in Application No. 104101330.
Taiwan Intellectual Property Office, Office Action dated May 4, 2017, in Application No. 105122491.
Taiwan Intellectual Property Office, Office Action dated Dec. 27, 2017, in Application No. 106111598.
Taiwan Intellectual Property Office, Office Action dated Oct. 24, 2018, in Application No. 106140199.
Taiwan Intellectual Property Office, Office Action dated Feb. 23, 2021, in Application No. 109128639.
Taiwan Intellectual Property Office, Office Action dated Mar. 8, 2021, in Application No. 109110084.
United States Patent and Trademark Office, Office Action dated Jan. 10, 2020, in U.S. Appl. No. 16/503,916.
United States Patent and Trademark Office, Office Action dated Sep. 18, 2020, in U.S. Appl. No. 16/503,916.
United States Patent and Trademark Office, Notice of Allowance dated Apr. 15, 2021, in U.S. Appl. No. 16/503,916.
Chinese Patent Office, Office Action dated Apr. 6, 2022, in Application No. 202110771012.4.
Chinese Patent Office, Office Action dated Dec. 30, 2021, in Application No. 202110379198.9.
Chinese Patent Office, Office Action dated Jul. 5, 2022, in Application No. 202110865735.0.
Chinese Patent Office, Office Action dated Mar. 1, 2022, in Application No. 202110379198.9.
Chinese Patent Office, Office Action dated Mar. 29, 2022, in Application No. 202110263198.2.
Chinese Patent Office, Office Action dated Nov. 2, 2021, in Application No. 202110263198.2.
Ren, Zhicheng and Zhou, Zhong, "Principle and Application Guide for Electric Power Digital Meters," pp. 88-89 entitled "TOP221Y Switching Power Supply Voltage Regulator Chip," China Electric Power Publishing: Beijing, China; 2007.
Taiwan Intellectual Property Office, Office Action dated Apr. 13, 2022, in Application No. 110129676.
Taiwan Intellectual Property Office, Office Action dated May 3, 2022, in Application No. 110138601.
United States Patent and Trademark Office, Notice of Allowance dated Feb. 8, 2022, in U.S. Appl. No. 16/503,916.
United States Patent and Trademark Office, Notice of Allowance dated Jul. 12, 2022, in U.S. Appl. No. 16/787,869.
United States Patent and Trademark Office, Notice of Allowance dated Jul. 13, 2022, in U.S. Appl. No. 16/786,372.
United States Patent and Trademark Office, Notice of Allowance dated Jul. 6, 2022, in U.S. Appl. No. 16/503,916.
Taiwan Intellectual Property Office, Office Action dated Oct. 11, 2022, in Application No. 110136342.
United States Patent and Trademark Office, Notice of Allowance dated Oct. 19, 2022, in U.S. Appl. No. 16/503,916.
United States Patent and Trademark Office, Notice of Allowance dated Oct. 3, 2022, in U.S. Appl. No. 16/787,869.
United States Patent and Trademark Office, Office Action dated Oct. 14, 2022, in U.S. Appl. No. 16/786,372.
United States Patent and Trademark Office, Office Action dated Oct. 17, 2022, in U.S. Appl. No. 17/333,844.
Beijing East IP LTD., Statement attached with a Mailing List, submitted to the State Intellectual Property Office of China on Apr. 29, 2015, and resubmitted to the State Intellectual Property Office of China on Nov. 18, 2015, requesting correction of the filing date for Chinese Patent Application No. 201210118202.7.
State Intellectual Property Office of China, Formal Letter of Examination dated Dec. 2, 2015, in Application No. 201210118202.7.
State Intellectual Property Office of China, print-out of bibliographic data from http://cpquery.sipo.gov.cn of Chinese Patent Application No. 201210118202.7, dated Feb. 25, 2016.
United States Patent and Trademark Office, Office Action dated Sep. 10, 2021, in U.S. Appl. No. 16/786,372.
United States Patent and Trademark Office, Office Action dated Sep. 10, 2021, in U.S. Appl. No. 16/787,869.
Chinese Patent Office, Office Action dated Mar. 16, 2023, in Application No. 202010471872.1.
Taiwan Intellectual Property Office, Office Action dated Nov. 11, 2022, in Application No. 110142621.
United States Patent and Trademark Office, Notice of Allowance dated Feb. 2, 2023, in U.S. Appl. No. 17/333,844.
United States Patent and Trademark Office, Notice of Allowance dated Mar. 15, 2023, in U.S. Appl. No. 17/333,844.
United States Patent and Trademark Office, Notice of Allowance dated Mar. 29, 2023, in U.S. Appl. No. 16/786,372.
United States Patent and Trademark Office, Notice of Allowance dated May 12, 2023, in U.S. Appl. No. 16/786,372.
United States Patent and Trademark Office, Notice of Allowance dated Apr. 27, 2023, in U.S. Appl. No. 17/333,844.

* cited by examiner

SYSTEMS AND METHODS FOR CONTROLLING SYNCHRONOUS RECTIFICATION

1. CROSS-REFERENCES TO RELATED APPLICATIONS

This application claims priority to Chinese Patent Application No. 202010063404.0, filed Jan. 20, 2020, incorporated by reference herein for all purposes.

2. BACKGROUND OF THE INVENTION

Certain embodiments of the present invention are directed to circuits. More particularly, some embodiments of the invention provide systems and methods for controlling synchronous rectification. Merely by way of example, some embodiments of the invention have been applied to flyback power converters. But it would be recognized that the invention has a much broader range of applicability.

With development of the modern electronics, the operation voltage of many electronic circuits have become lower, but the operation current of the electronic circuits have become higher. Accordingly, the overall power consumption of the electronic circuits have become more important for circuit design. In a conventional power converter, the rectification circuit on the secondary side often employs a Schottky diode, but as the operation voltage decreases, the power efficiency of the rectification circuit also decreases. To improve power efficiency, the synchronous rectification technique has been used for power converters that have low operation voltage and high operation current. Usually, the synchronous rectification technique achieves high power efficiency by replacing the Schottky diode with a power metal-oxide-semiconductor field-effect transistors (MOSFET) with low on-resistance.

FIG. 1 is a simplified diagram showing a conventional flyback power converter with synchronous rectification. As shown in FIG. 1, the flyback power converter 100 includes a primary winding 110 and a secondary winding 112, which are parts of a transformer (e.g., a transformer T). On the primary side, the flyback power converter 100 also includes a bridge rectifier 120 (e.g., a rectifier that includes four diodes), a resistor 130 (e.g., $R_{st}$), a resistor 132 (e.g., $R_{cs}$), a capacitor 140 (e.g., $C_{bulk}$), a capacitor 142 (e.g., $C_p$), a transistor 150 (e.g., a power MOSFET MS1), and a pulse-width-modulation controller 152 (e.g., a controller chip U1). Additionally, on the secondary side, the flyback power converter 100 also includes a controller 160 for synchronous rectification (e.g., a controller chip U2), a capacitor 170 (e.g., $C_{out}$), a transistor 180 (e.g., a MOSFET MS2), and a body diode 190 (e.g., a parasitic diode of the transistor 180).

As shown in FIG. 1, an alternating current (AC) input voltage 122 is rectified by the bridge rectifier 120 and then filtered by the capacitor 140 (e.g., $C_{bulk}$). One terminal of the capacitor 140 (e.g., $C_{bulk}$) is connected to one terminal of the resistor 130 (e.g., $R_{st}$) and one terminal of the primary winding 110. Another terminal of the primary winding 110 is connected to the drain terminal of the transistor 150 (e.g., the MOSFET MS1), and another terminal of the resistor 130 (e.g., $R_{st}$) is connected to one terminal of the capacitor 142 (e.g., $C_p$) and is also connected to a terminal 154 (e.g., VCC) of the pulse-width-modulation controller 152 (e.g., the controller chip U1). Additionally, a terminal 156 (e.g., gate1) of the pulse-width-modulation controller 152 (e.g., the controller chip U1) is connected to the gate terminal of the transistor 150 (e.g., the MOSFET MS1). The pulse-width-modulation controller 152 (e.g., the controller chip U1) outputs a voltage 148 through the terminal 156 (e.g., gate1) to the gate terminal of the transistor 150 (e.g., the MOSFET MS1). A terminal 158 (e.g., CS) of the pulse-width-modulation controller 152 (e.g., the controller chip U1) is connected to the source terminal of the transistor 150 (e.g., the MOSFET MS1) and is also connected to one terminal of the resistor 132 (e.g., $R_{cs}$). Another terminal of the resistor 132 (e.g., $R_{cs}$) and a terminal 144 (e.g., GND) of the pulse-width-modulation controller 152 (e.g., the controller chip U1) both are biased to the ground voltage on the primary side.

One terminal of the secondary winding 112 is connected to the cathode of the body diode 190, the drain terminal of the transistor 180 (e.g., the MOSFET MS2), and a terminal 162 (e.g., $V_d$) of the controller 160 for synchronous rectification (e.g., the controller chip U2). Additionally, another terminal of the secondary winding 112 is connected to one terminal of the capacitor 170 (e.g., $C_{out}$) and is also connected to a terminal 164 (e.g., $V_{in}$) of the controller 160 for synchronous rectification (e.g., the controller chip U2). The source terminal of the transistor 180 (e.g., the MOSFET MS2) is connected to the anode of the body diode 190, and the gate terminal of the transistor 180 (e.g., the MOSFET MS2) is connected to a terminal 166 (e.g., gate2) of the controller 160 for synchronous rectification (e.g., the controller chip U2). Another terminal of the capacitor 170 (e.g., $C_{out}$), the source terminal of the transistor 180 (e.g., the MOSFET MS2), and a terminal 168 (e.g., GND) of the controller 160 for synchronous rectification (e.g., the controller chip U2) all are biased to the ground voltage on the secondary side. The output voltage 172 (e.g., $V_{out}$) represents the voltage drop between the two terminals of the capacitor 170 (e.g., $C_{out}$). Also as shown in FIG. 1, a current 146 flows through the primary winding 110, and a current 192 (e.g., $I_{sec}$) flows through the secondary winding 112. The controller 160 for synchronous rectification (e.g., the controller chip U2) receives a voltage 194 through the terminal 162 (e.g., $V_d$) from the drain terminal of the transistor 180 (e.g., the MOSFET MS2), and outputs a voltage 196 through the terminal 166 (e.g., gate2) to the gate terminal of the transistor 180 (e.g., the MOSFET MS2).

For the flyback power converter 100, the controller 160 for synchronous rectification (e.g., the controller chip U2) and the transistor 180 (e.g., the MOSFET MS2) are parts of a synchronous rectification system (e.g., a synchronous rectifier). The synchronous rectification system replaces a Schottky diode in order to raise power efficiency (e.g., reducing heat generation) and improve current generation capability. Such synchronous rectification system often is used in a system with a large output current.

FIG. 2 is a simplified diagram showing another conventional flyback power converter with synchronous rectification. As shown in FIG. 2, the flyback power converter 200 includes a primary winding 210 and a secondary winding 212, which are parts of a transformer (e.g., a transformer T). On the primary side, the flyback power converter 200 also includes a bridge rectifier 220 (e.g., a rectifier that includes four diodes), a resistor 230 (e.g., $R_{st}$), a resistor 232 (e.g., $R_{cs}$), a capacitor 240 (e.g., $C_{bulk}$), a capacitor 242 (e.g., $C_p$), a transistor 250 (e.g., a power MOSFET MS1), and a pulse-width-modulation controller 252 (e.g., a controller chip U1). Additionally, on the secondary side, the flyback power converter 200 also includes a controller 260 for synchronous rectification (e.g., a controller chip U2), a capacitor 270 (e.g., $C_{out}$), and a transistor 280 (e.g., a MOSFET MS2), and a body diode 290 (e.g., a parasitic diode of the transistor 280).

As shown in FIG. 2, an alternating current (AC) input voltage 222 is rectified by the bridge rectifier 220 and then filtered by the capacitor 240 (e.g., $C_{bulk}$). One terminal of the capacitor 240 (e.g., $C_{bulk}$) is connected to one terminal of the resistor 230 (e.g., $R_{st}$) and one terminal of the primary winding 210. Another terminal of the primary winding 210 is connected to the drain terminal of the transistor 250 (e.g., the MOSFET MS1), and another terminal of the resistor 230 (e.g., $R_{st}$) is connected to one terminal of the capacitor 242 (e.g., $C_p$) and is also connected to a terminal 254 (e.g., VCC) of the pulse-width-modulation controller 252 (e.g., the controller chip U1). Additionally, a terminal 256 (e.g., gate1) of the pulse-width-modulation controller 252 (e.g., the controller chip U1) is connected to the gate terminal of the transistor 250 (e.g., the MOSFET MS1). The pulse-width-modulation controller 252 (e.g., the controller chip U1) outputs a voltage 248 through the terminal 256 (e.g., gate1) to the gate terminal of the transistor 250 (e.g., the MOSFET MS1). A terminal 258 (e.g., CS) of the pulse-width-modulation controller 252 (e.g., the controller chip U1) is connected to the source terminal of the transistor 250 (e.g., the MOSFET MS1) and is also connected to one terminal of the resistor 232 (e.g., $R_{cs}$). Another terminal of the resistor 232 (e.g., $R_{cs}$) and a terminal 244 (e.g., GND) of the pulse-width-modulation controller 252 (e.g., the controller chip U1) both are biased to the ground voltage on the primary side.

One terminal of the secondary winding 212 is connected to the anode of the body diode 290, the source terminal of the transistor 280 (e.g., the MOSFET MS2), and a terminal 268 (e.g., GND) of the controller 260 for synchronous rectification (e.g., the controller chip U2). Additionally, another terminal of the secondary winding 212 is biased to the ground voltage on the secondary side. The gate terminal of the transistor 280 (e.g., the MOSFET MS2) is connected to a terminal 266 (e.g., gate2) of the controller 260 for synchronous rectification (e.g., the controller chip U2). The drain terminal of the transistor 280 (e.g., the MOSFET MS2) is connected to the cathode of the body diode 290, a terminal 262 (e.g., $V_d$) of the controller 260 for synchronous rectification (e.g., the controller chip U2), and one terminal of the capacitor 270 (e.g., $C_{out}$). Another terminal of the capacitor 270 (e.g., $C_{out}$) is biased to the ground voltage on the secondary side. The output voltage 272 (e.g., $V_{out}$) represents the voltage drop between the two terminals of the capacitor 270 (e.g., $C_{out}$). A terminal 264 (e.g., $V_{in}$) of the controller 260 for synchronous rectification (e.g., the controller chip U2) is not biased (e.g., floating electrically).

Also as shown in FIG. 2, a current 246 flows through the primary winding 210, and a current 292 (e.g., $I_{sec}$) flows through the secondary winding 212. The controller 260 for synchronous rectification (e.g., the controller chip U2) receives a voltage 294 through the terminal 262 (e.g., $V_d$) from the drain terminal of the transistor 280 (e.g., the MOSFET MS2), and outputs a voltage 296 through the terminal 266 (e.g., gate2) to the gate terminal of the transistor 280 (e.g., the MOSFET MS2).

FIG. 3 is a simplified diagram showing a conventional controller 360 for synchronous rectification. The controller 360 for synchronous rectification includes a terminal 362 (e.g., $V_d$), a terminal 364 (e.g., $V_{in}$), a terminal 366 (e.g., gate2), and a terminal 368 (e.g., GND). As shown in FIG. 3, the controller 360 for synchronous rectification also includes a low-dropout regulator 310, a reference signal generator 320, a switch 330 (e.g., a transistor), a voltage slope detector 340, a NOR gate 344, a voltage adjustment component 350, a comparator 352, a minimum turn-on component 354, a turn-off control component 370, a NOR gate 374, a flip-flop 380, and a driver 390.

As shown in FIG. 3, the low-dropout regulator 310 receives an input voltage 312 through the terminal 364 and a voltage 332 through the terminal 362 and generates a supply voltage 314 (e.g., AVDD) based at least in part on the input voltage 312 and/or the voltage 332. If the terminal 364 is not biased (e.g., floating electrically), the low-dropout regulator 310 generates the supply voltage 314 (e.g., AVDD) based at least in part on the voltage 332. The supply voltage 314 is received by the reference signal generator 320, which in response generates one or more predetermined reference voltages (e.g., $V_{ref}$) and/or one or more predetermined reference currents (e.g., $I_{bias}$ and/or $I_s$). Additionally, the supply voltage 314 is also received by the gate terminal of the transistor 330 (e.g., a high-voltage transistor). The drain terminal of the transistor 330 receives the voltage 332 through the terminal 362, and the source terminal of the transistor 330 is biased at a voltage 334. If the transistor 330 is turned on by the supply voltage 314, the voltage 334 is equal to the voltage 332. The voltage 334 is received by the voltage slope detector 340, the voltage adjustment component 350, and the turn-off control component 370.

The voltage adjustment component 350 receives the voltage 334 and generates a voltage 351 based at least in part on the voltage 334. The voltage 351 is equal to the voltage 334 minus a predetermined threshold voltage (e.g., $V_t$(on)), and the predetermined threshold voltage (e.g., $V_t$(on)) is negative. Hence, if the transistor 330 is turned on, $$V_{351} = V_{332} - V_t(on) \quad \text{(Equation 1)}$$

where $V_{351}$ represents the voltage 351, and $V_{332}$ represents the voltage 332. Additionally, $V_t$(on) represents the predetermined threshold voltage, which has a negative value.

As shown in FIG. 3, the voltage 351 is received by the non-inverting input terminal (e.g., the "+" input terminal) of the comparator 352, which also includes an inverting input terminal (e.g., the "−" input terminal). The inverting input terminal of the comparator 352 is biased to the ground voltage (e.g., the ground voltage on the secondary side). Based at least in part on the voltage 351 received by the non-inverting input terminal and the ground voltage received by the inverting input terminal, the comparator 352 generates a signal 353. The signal 353 is at a logic high level if the voltage 351 is higher than the ground voltage, and the signal 353 is at a logic low level if the voltage 351 is lower than the ground voltage. The signal 353 is received by the NOR gate 344.

A signal 382 is received by the minimum turn-on component 354, which in response, generates a signal 355 based at least in part on the signal 382. If the signal 382 changes from the logic low level to the logic high level when the signal 355 is at the logic low level, the signal 355 changes from the logic low level to the logic high level. After the signal 355 changes from the logic low level to the logic high level, the signal 355 remains at the logic high level for at least a predetermined minimum turn-on time duration. During the predetermined minimum turn-on time duration, the signal 355 remains at the logic high level, even if the signal 382 changes from the logic high level to the logic low level. The signal 355 is received by the NOR gate 374.

The voltage slope detector 340 receives the voltage 334, detects the falling slope of the voltage 334, and generates a signal 342 based at least in part on the detected falling slope.

The signal 342 is received by the NOR gate 344, which also receives the signal 353 and generates a signal 346 based at least in part on the signal 342 and the signal 353. If the transistor 330 is turned on by the supply voltage 314, the voltage slope detector 340 receives the voltage 332, detects the falling slope of the voltage 332, and generates the signal 342 based at least in part on the detected falling slope. Additionally, the turn-off control component 370 also receives the voltage 334 and generates a signal 372 based at least in part on the voltage 334. If the transistor 330 is turned on by the supply voltage 314, the turn-off control component 370 receives the voltage 332 and generates the signal 372 based at least in part on the voltage 332. The signal 372 is received by the NOR gate 374, which also receives the signal 355 and generates a signal 376 based at least in part on the signal 355 and the signal 372.

As shown in FIG. 3, the signal 346 and the signal 376 are received by the flip-flop 380, which in response generates the signal 382 (e.g., sr) based at least in part on the signal 346 and the signal 376. The flip-flop 380 includes an R terminal, an S terminal, and a QN terminal. The R terminal receives the signal 346, the S terminal receives the signal 376, and the QN terminal outputs the signal 382 (e.g., sr). The driver 390 receives the signal 382 (e.g., sr), generates a voltage 392 (e.g., a drive voltage) based at least in part on the signal 382, and sends out the voltage 392 through the terminal 366.

In some examples, the controller 360 for synchronous rectification is a part of the flyback power converter 100, and the controller 360 for synchronous rectification is the same as the controller 160 for synchronous rectification. The terminal 362 is the same as the terminal 162, the terminal 364 is the same as the terminal 164, the terminal 366 is the same as the terminal 166, and the terminal 368 is the same as the terminal 168. Additionally, the voltage 332 is the same as the voltage 194, and the voltage 392 is the same as the voltage 196.

In certain examples, the controller 360 for synchronous rectification is a part of the flyback power converter 200, and the controller 360 for synchronous rectification is the same as the controller 260 for synchronous rectification. The terminal 362 is the same as the terminal 262, the terminal 364 is the same as the terminal 264, the terminal 366 is the same as the terminal 266, and the terminal 368 is the same as the terminal 268. Additionally, the voltage 332 is the same as the voltage 294, and the voltage 392 is the same as the voltage 296.

Usually, the flyback power converter 100 can operate in different modes depending on the input voltage, the output voltage, and/or the output current of the flyback power converter 100, and the flyback power converter 200 can also operate in different modes depending on the input voltage, the output voltage, and/or the output current of the flyback power converter 200. These different modes include discontinuous conduction mode (DCM), quasi resonant (QR) mode, and continuous conduction mode (CCM). The continuous conduction mode (CCM) includes the shallow continuous conduction mode (SCCM) and the deep continuous conduction mode (DCCM), wherein the shallow continuous conduction mode (SCCM) can serve as a transition from the discontinuous conduction mode (DCM) to the deep continuous conduction mode (DCCM). During operation, the power MOSFET 150 of the flyback power converter 100 and/or the power MOSFET 250 of the flyback power converter 200 may become damaged under certain circumstances.

Hence it is highly desirable to improve the synchronous rectification technique.

3. BRIEF SUMMARY OF THE INVENTION

Certain embodiments of the present invention are directed to circuits. More particularly, some embodiments of the invention provide systems and methods for controlling synchronous rectification. Merely by way of example, some embodiments of the invention have been applied to flyback power converters. But it would be recognized that the invention has a much broader range of applicability.

According to some embodiments, a system for controlling synchronous rectification includes: a switch including a first switch terminal configured to receive a first voltage, the switch further including a second switch terminal and being configured to be closed or opened by a control signal; a voltage generator configured to receive a second voltage from the second switch terminal and generate a third voltage based at least in part on the second voltage; a filter circuit including a resistor and a capacitor, the filter circuit being configured to receive the second voltage from the second switch terminal and generate a fourth voltage based at least in part on the second voltage; a first comparator configured to receive the third voltage and the fourth voltage and generate a first comparison signal based at least in part on the third voltage and the four voltage; a second comparator configured to receive a predetermined threshold voltage and the first voltage and generate a second comparison signal based at least in part on the predetermined threshold voltage and the first voltage; and a signal generator configured to generate the control signal based on at least information associated with the first comparison signal and the second comparison signal.

According to certain embodiments, a system for controlling synchronous rectification includes: a first comparator configured to receive a first threshold voltage and an input voltage and generate a first comparison signal based at least in part on the first threshold voltage and the input voltage; a voltage selector configured to receive a second threshold voltage and a third threshold voltage, select the second threshold voltage or the third threshold voltage based on at least information associated with the first comparison signal, output the selected second threshold voltage or the selected third threshold voltage as an output voltage; a second comparator configured to receive the output voltage and the input voltage and generate a second comparison signal based at least in part on the output voltage and the input voltage, the output voltage being either the selected second threshold voltage or the selected third threshold voltage; and a signal generator configured to generate a control signal based on at least information associated with the second comparison signal; wherein the voltage selector is further configured to: select the second threshold voltage as the output voltage if the first threshold voltage is smaller than the input voltage; and select the third threshold voltage as the output voltage if the first threshold voltage is larger than the input voltage; wherein the second threshold voltage is larger than the third threshold voltage.

According to some embodiments, a method for controlling synchronous rectification includes: receiving a first voltage by a first switch terminal of a switch, the switch further including a second switch terminal and being configured to be closed or opened by a control signal; receiving a second voltage from the second switch terminal; generating a third voltage based at least in part on the second voltage by the voltage generator; generating a fourth voltage based at least in part on the second voltage by a filter circuit including a resistor and a capacitor; receiving the third voltage and the fourth voltage; generating a first comparison signal based at least in part on the third voltage and the four voltage; receiving a predetermined threshold voltage and the first voltage; generating a second comparison signal based at least in part on the predetermined threshold voltage and the first voltage; and generating the control signal based on at least information associated with the first comparison signal and the second comparison signal.

According to certain embodiments, a method for controlling synchronous rectification includes: receiving a first threshold voltage and an input voltage; generating a first comparison signal based at least in part on the first threshold voltage and the input voltage; receiving a second threshold voltage and a third threshold voltage; selecting the second threshold voltage or the third threshold voltage based on at least information associated with the first comparison signal; outputting the selected second threshold voltage or the selected third threshold voltage as an output voltage receiving the output voltage and the input voltage, the output voltage being either the selected second threshold voltage or the selected third threshold voltage; generating a second comparison signal based at least in part on the output voltage and the input voltage; and generating a control signal based on at least information associated with the second comparison signal; wherein the selecting the second threshold voltage or the third threshold voltage based on at least information associated with the first comparison signal includes: selecting the second threshold voltage as the output voltage if the first threshold voltage is smaller than the input voltage; and selecting the third threshold voltage as the output voltage if the first threshold voltage is larger than the input voltage; wherein the second threshold voltage is larger than the third threshold voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for controlling synchronous rectification. Merely by way of example, some embodiments of the invention have been applied to flyback power converters. But it would be recognized that the invention has a much broader range of applicability.

Figure 1:
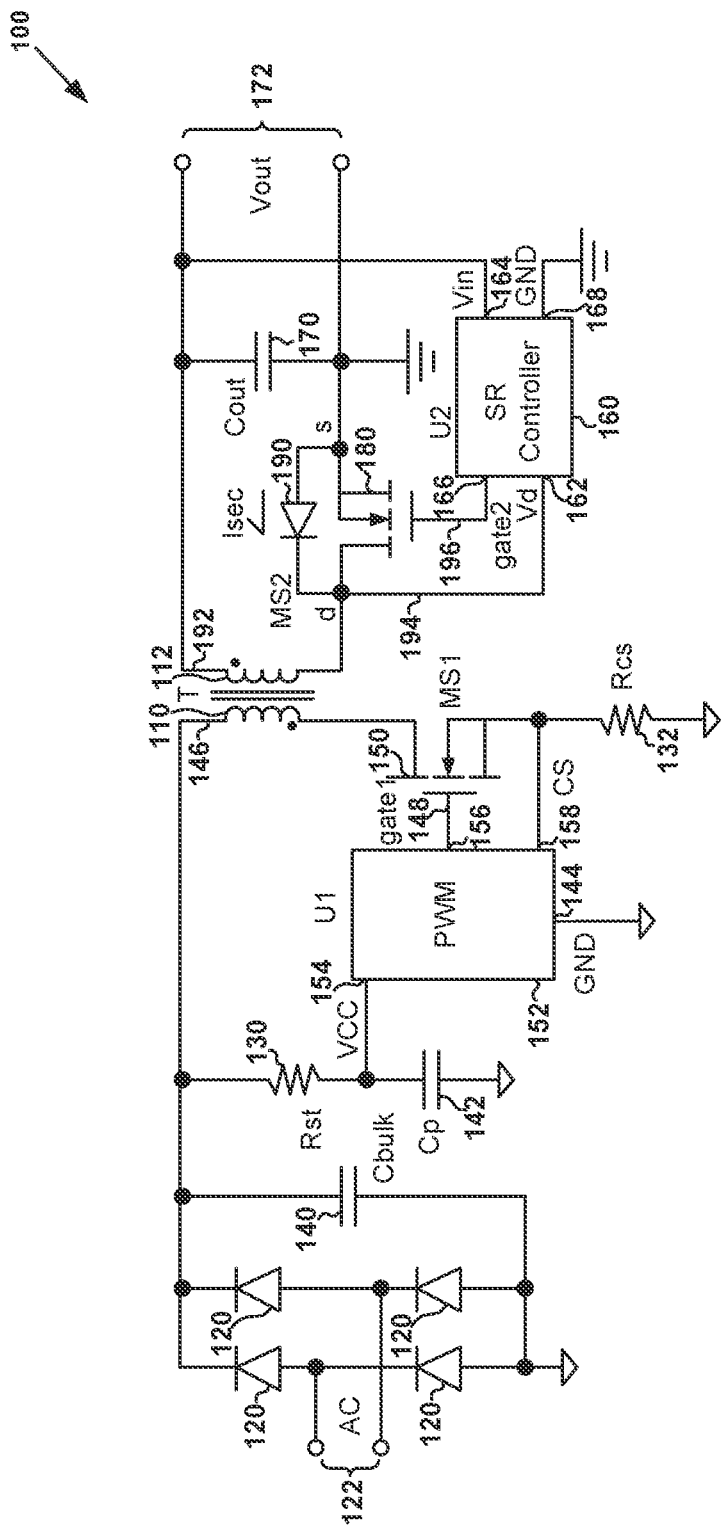
FIG. 1 is a simplified diagram showing a conventional flyback power converter with synchronous rectification.
Figure 3:
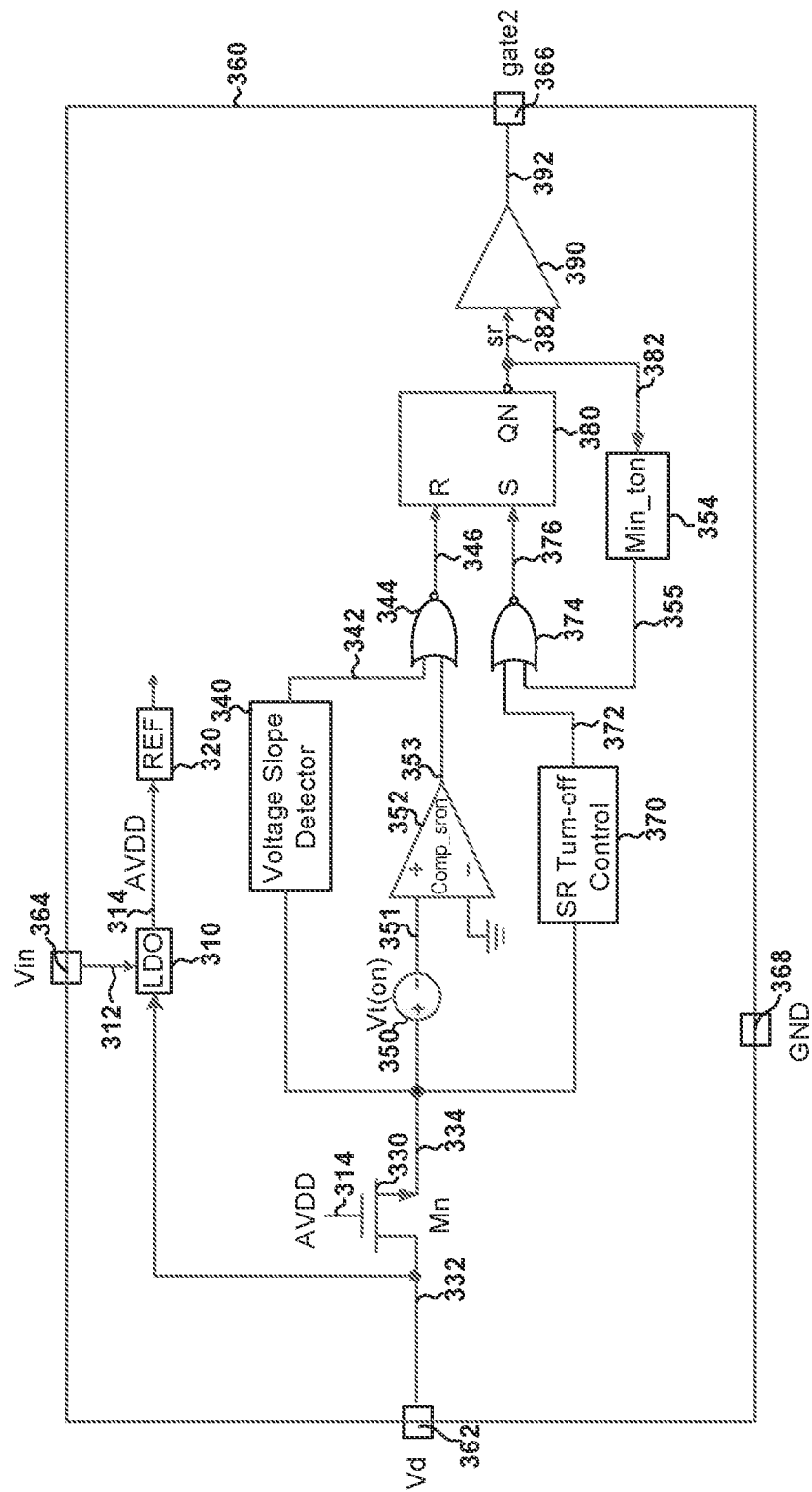
FIG. 3 is a simplified diagram showing a conventional controller 360 for synchronous rectification.
Figure 4:
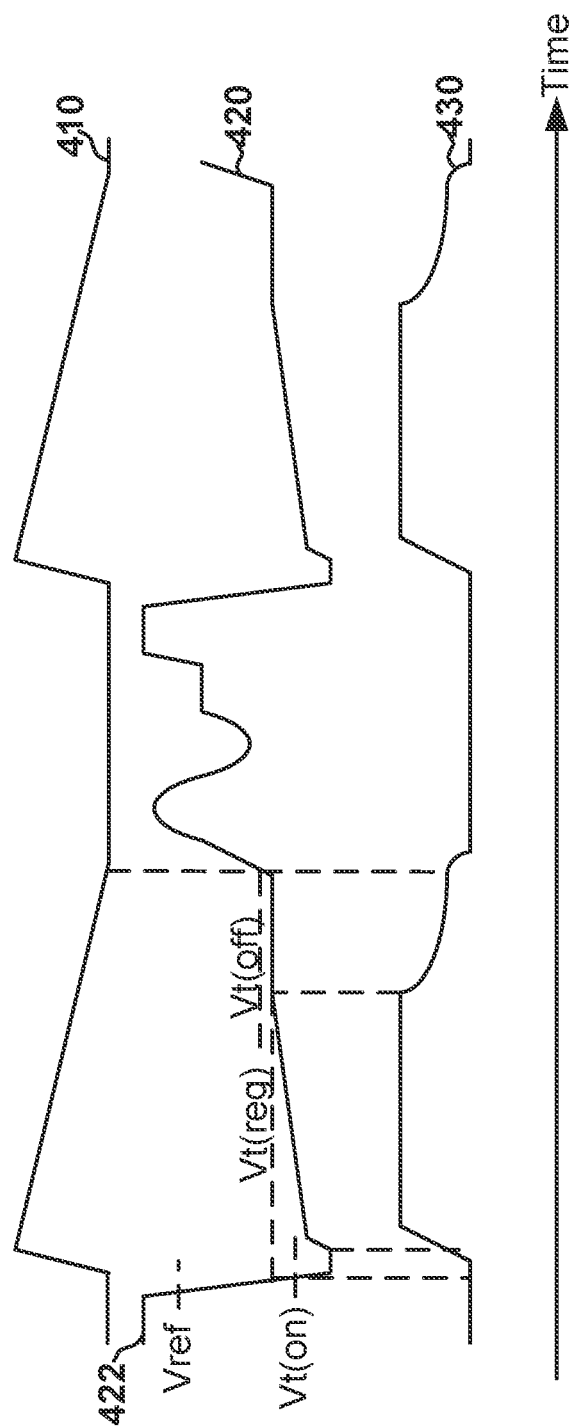
FIG. 4 shows simplified timing diagrams in discontinuous conduction mode (DCM) and in shallow continuous conduction mode (SCCM) related to the controller for synchronous rectification as part of the flyback power converter as shown in FIG. 1 and FIG. 3 according to some embodiments.

FIG. 4 shows simplified timing diagrams in discontinuous conduction mode (DCM) and in shallow continuous conduction mode (SCCM) related to the controller 360 for synchronous rectification as part of the flyback power converter 100 as shown in FIG. 1 and FIG. 3 according to some embodiments. These diagrams are merely examples, which should not unduly limit the scope of the claims. One of ordinary skill in the art would recognize many variations, alternatives, and modifications. As shown in FIG. 4, the waveform 410 represents the current 192 (e.g., $I_{sec}$) as a function of time, the waveform 420 represents the voltage 194 (e.g., the voltage 332) as a function of time, and the waveform 430 represents the voltage 196 (e.g., the voltage 392) as a function of time.

As shown in FIG. 1, the voltage 194 (e.g., the voltage 332) represents the voltage drop from the drain terminal of the transistor 180 (e.g., the MOSFET MS2) to the source terminal of the transistor 180 (e.g., the MOSFET MS2) according to certain embodiments. As shown in FIG. 3, $V_{ref}$ represents a predetermined reference voltage generated by the reference signal generator 320 and $V_t$ (on) represents the predetermined threshold voltage related to the voltage adjustment component 350 according to some embodiments. For example, $V_t$ (on) is used for turning on the synchronous rectification system (e.g., the synchronous rectifier), $V_t$ (reg) is used for regulating the voltage drop from the drain terminal of the transistor 180 (e.g., the MOSFET MS2) to the source terminal of the transistor 180 (e.g., the MOSFET MS2), and $V_t$ (off) is used for turning off the synchronous rectification system (e.g., the synchronous rectifier). As an example, $V_{ref}$ is larger than zero, $V_t$ (on) is equal to −200 mV, $V_t$ (reg) is equal to −40 mV, and $V_t$ (off) is equal to −20 mV.

In certain embodiments, if the transistor 150 (e.g., the power MOSFET MS1) is turned off, the current 146 that flows through the primary winding 110 drops to zero. For example, when the current 146 drops to zero, the voltage 194 (e.g., the voltage 332) decreases from a voltage level 422, passing through $V_{ref}$, zero, and $V_t$ (on) as shown by the waveform 420. As an example, the transistor 180 (e.g., the MOSFET MS2) is not yet turned on, and the current 192 flows through the body diode 190. In some embodiments, if the voltage slope detector 340 determines the time duration that the voltage 194 (e.g., the voltage 332) takes to decrease from the voltage level 422 to $V_t$ (on) is shorter than a predetermined time threshold (e.g., 150 ns), the voltage slope detector 340 outputs the signal 342 to the flip-flop 380 so that the flip-flop 380 changes the signal 382 from the logic low level to the logic high level when the voltage 194 (e.g., the voltage 332) becomes smaller than $V_t$ (on). For example, if the signal 382 changes from the logic low level to the logic high level, the driver 390 raises the voltage 196 (e.g., the voltage 392) to turn on the transistor 180 (e.g., the MOSFET MS2) as shown by the waveform 430.

According to some embodiments, with the decrease of the current 192, if the voltage 194 (e.g., the voltage 332) becomes larger than $V_t$ (reg), the voltage 196 (e.g., the voltage 392) becomes smaller so that the voltage 194 (e.g., the voltage 332) remains approximately equal to $V_t$ (reg), as shown by the waveforms 410, 420, and 430. According to certain embodiments, with the further decrease of the current 192, even if the voltage 196 (e.g., the voltage 392) keeps becoming smaller, the voltage 194 (e.g., the voltage 332) starts becoming larger, as shown by the waveforms 410, 420, and 430.

In certain embodiments, if the voltage 194 (e.g., the voltage 332) becomes larger than $V_t$ (off), the turn-off control component 370 changes the signal 372 so that the flip-flop 380 changes the signal 382 from the logic high level to the logic low level. For example, if the signal 382 changes from the logic high level to the logic low level, the driver 390 further lowers the voltage 196 (e.g., the voltage 392) in order to turn off the transistor 180 (e.g., the MOSFET MS2) as shown by the waveform 430. As an example, before the voltage 194 (e.g., the voltage 332) becomes larger than $V_t$ (off), the voltage 196 (e.g., the voltage 392) has already become small so the amount of time for the driver 390 to further lower the voltage 196 (e.g., the voltage 392) and turn off the transistor 180 (e.g., the MOSFET MS2) can be significantly shortened in order to reduce the spike of the voltage 194 (e.g., the voltage 332).

Figure 2:
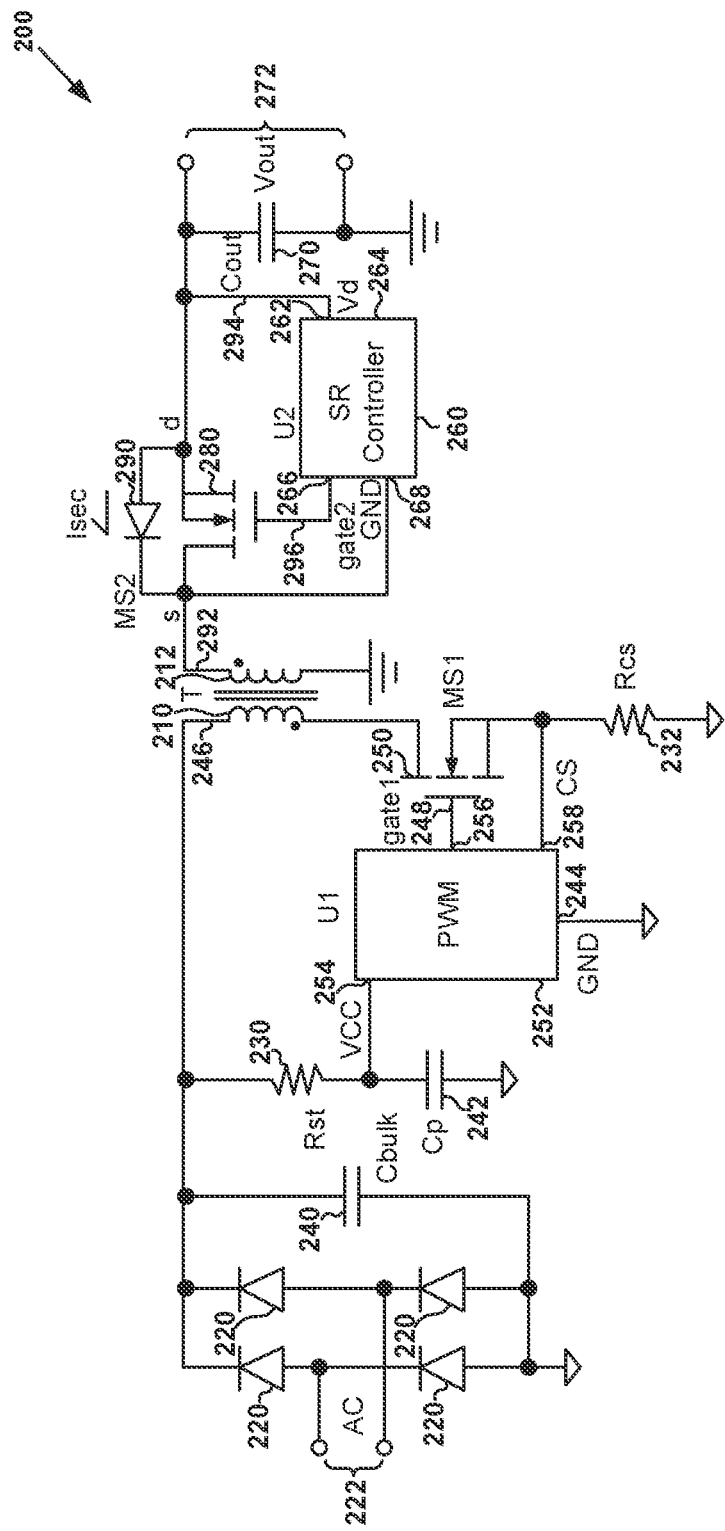
FIG. 2 is a simplified diagram showing another conventional flyback power converter with synchronous rectification.

As discussed above and further emphasized here, FIG. 4 is merely an example, which should not unduly limit the scope of the claims. One of ordinary skill in the art would recognize many variations, alternatives, and modifications. In some examples, FIG. 4 shows simplified timing diagrams in discontinuous conduction mode (DCM) and in shallow continuous conduction mode (SCCM) related to the controller 360 for synchronous rectification as part of the flyback power converter 200 as shown in FIG. 2 and FIG. 3. In certain examples, the waveform 410 represents the current 292 (e.g., $I_{sec}$) as a function of time, the waveform 420 represents the voltage 294 (e.g., the voltage 332) as a function of time, and the waveform 430 represents the voltage 296 (e.g., the voltage 392) as a function of time.

Figure 5:
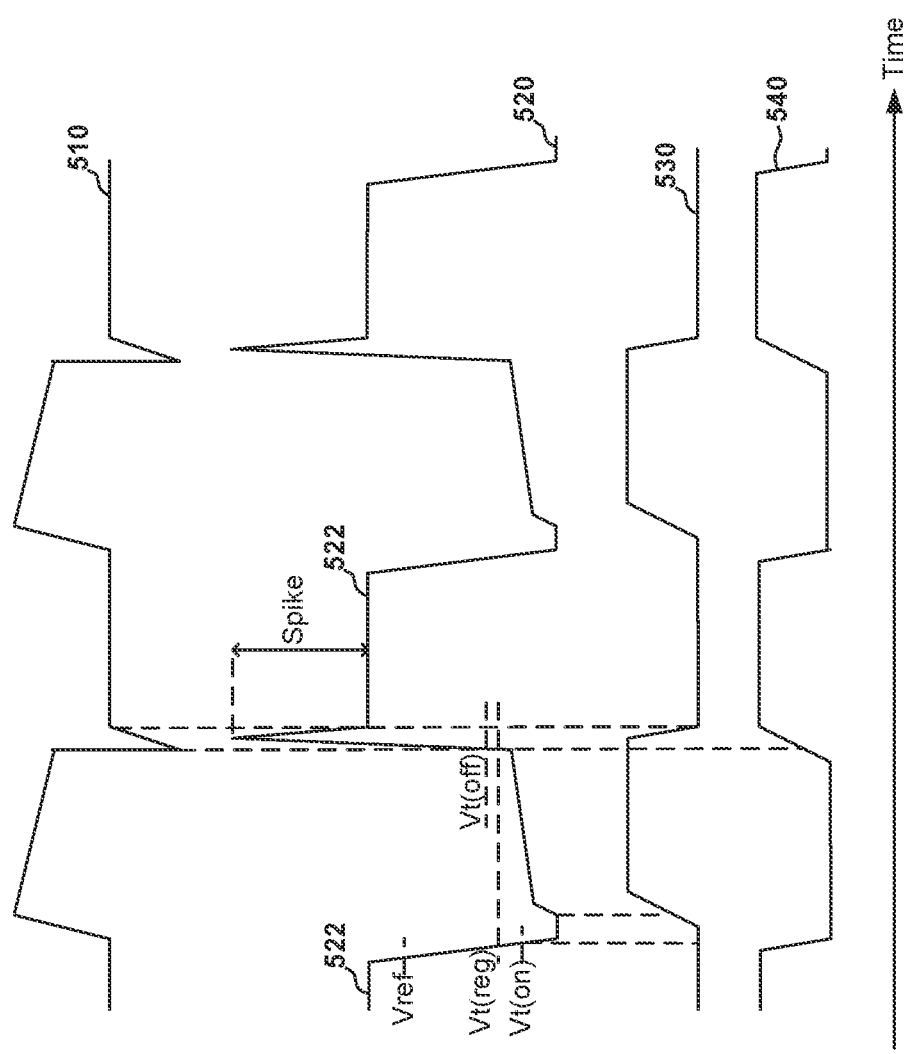
FIG. 5 shows simplified timing diagrams in deep continuous conduction mode (DCCM) related to the controller for synchronous rectification as part of the flyback power converter as shown in FIG. 1 and FIG. 3 according to certain embodiments.

FIG. 5 shows simplified timing diagrams in deep continuous conduction mode (DCCM) related to the controller 360 for synchronous rectification as part of the flyback power converter 100 as shown in FIG. 1 and FIG. 3 according to certain embodiments. These diagrams are merely examples, which should not unduly limit the scope of the claims. One of ordinary skill in the art would recognize many variations, alternatives, and modifications. As shown in FIG. 5, the waveform 510 represents the current 192 (e.g., $I_{sec}$) as a function of time, the waveform 520 represents the voltage 194 (e.g., the voltage 332) as a function of time, the waveform 530 represents the voltage 196 (e.g., the voltage 392) as a function of time, and the waveform 540 represents the voltage 148 as a function of time.

As shown in FIG. 1, the voltage 194 (e.g., the voltage 332) represents the voltage drop from the drain terminal of the transistor 180 (e.g., the MOSFET MS2) to the source terminal of the transistor 180 (e.g., the MOSFET MS2) according to certain embodiments. As shown in FIG. 5, $V_{ref}$ represents a predetermined reference voltage generated by the reference signal generator 320 and $V_t$ (on) represents the predetermined threshold voltage related to the voltage adjustment component 350 according to some embodiments. For example, $V_t$ (on) is used for turning on the synchronous rectification system (e.g., the synchronous rectifier), $V_t$ (reg) is used for regulating the voltage drop from the drain terminal of the transistor 180 (e.g., the MOSFET MS2) to the source terminal of the transistor 180 (e.g., the MOSFET MS2), and $V_t$ (off) is used for turning off the synchronous rectification system (e.g., the synchronous rectifier). As an example, $V_{ref}$ is larger than zero, $V_t$ (on) is equal to −200 mV, $V_t$ (reg) is equal to −40 mV, and $V_t$ (off) is equal to −20 mV.

In certain embodiments, if the transistor 150 (e.g., the power MOSFET MS1) is turned off, the current 146 that flows through the primary winding 110 drops to zero. For example, when the current 146 drops to zero, the voltage 194 (e.g., the voltage 332) decreases from a voltage level 522, passing through $V_{ref}$, zero, and $V_t$ (on) as shown by the waveform 520. As an example, the transistor 180 (e.g., the MOSFET MS2) is not yet turned on, and the current 192 flows through the body diode 190. In some embodiments, if the voltage slope detector 340 determines the time duration that the voltage 194 (e.g., the voltage 332) takes to decrease from the voltage level 522 to $V_t$ (on) is shorter than a predetermined time threshold (e.g., 150 ns), the voltage slope detector 340 outputs the signal 342 to the flip-flop 380 so that the flip-flop 380 changes the signal 382 from the logic low level to the logic high level when the voltage 194 (e.g., the voltage 332) becomes smaller than $V_t$ (on). For example, if the signal 382 changes from the logic low level to the logic high level, the driver 390 raises the voltage 196 (e.g., the voltage 392) to turn on the transistor 180 (e.g., the MOSFET MS2) as shown by the waveform 530.

According to some embodiments, before the voltage 194 (e.g., the voltage 332) becomes larger than $V_t$ (reg), the voltage 148 becomes larger so that the transistor 150 (e.g., the power MOSFET MS1) is turned on as shown by the waveform 540. According to certain embodiments, when the transistor 150 (e.g., the power MOSFET MS1) is turned on, the voltage 196 (e.g., the voltage 392) is still at a high voltage level so the transistor 180 (e.g., the MOSFET MS2) remains turned on as shown by the waveform 530.

In certain embodiments, when the voltage 194 (e.g., the voltage 332) becomes larger than $V_t$ (off), the turn-off control component 370 changes the signal 372 so that the flip-flop 380 changes the signal 382 from the logic high level to the logic low level. For example, if the signal 382 changes from the logic high level to the logic low level, the driver 390 lowers the voltage 196 (e.g., the voltage 392) to turn off the transistor 180 (e.g., the MOSFET MS2) as shown by the waveform 530. As an example, before the voltage 194 (e.g., the voltage 332) becomes larger than $V_t$ (off), the voltage 196 (e.g., the voltage 392) has not yet become small so the amount of time for the driver 390 to lower the voltage 196 (e.g., the voltage 392) and turn off the transistor 180 (e.g., the MOSFET MS2) is long and the spike of the voltage 194 (e.g., the voltage 332) is large as shown by the waveform 520. In some embodiments, the voltage 194 (e.g., the voltage 332) quickly becomes larger than not only $V_t$ (reg) but also $V_t$ (off) and generates the spike.

In some examples, during the spike, the current 192 (e.g., $I_{sec}$) flows from the drain terminal of the transistor 180 (e.g., the MOSFET MS2) to the source terminal of the transistor 180 (e.g., the MOSFET MS2). In certain examples, after the spike, the voltage 194 (e.g., the voltage 332) remains at the voltage level 522 for a time duration. For example, the cumulative effect of the spike and the voltage level 522 for the voltage 194 (e.g., the voltage 332) can damage the transistor 180 (e.g., a MOSFET MS2).

As shown in FIG. 5, after the transistor 150 (e.g., the power MOSFET MS1) becomes turned on but before the transistor 180 (e.g., the MOSFET MS2) becomes turned off, the voltage 194 (e.g., the voltage 332) increases very quickly before the spike is generated as shown by the waveform 520 according to certain embodiments. For example, this rate of increase for the voltage 194 (e.g., the voltage 332) to generate the spike is significantly larger than the rate of increase for the voltage 194 (e.g., the voltage 332) during the normal demagnetization process. As an example, by detecting this rate of increase for the voltage 194 (e.g., the voltage 332) to generate the spike, the synchronous rectification system (e.g., a synchronous rectifier) can be turned off accurately and quickly.

As discussed above and further emphasized here, FIG. 5 is merely an example, which should not unduly limit the scope of the claims. One of ordinary skill in the art would recognize many variations, alternatives, and modifications. In some examples, FIG. 5 shows simplified timing diagrams in deep continuous conduction mode (DCCM) related to the controller 360 for synchronous rectification as part of the flyback power converter 200 as shown in FIG. 2 and FIG. 3. In certain examples, the waveform 510 represents the current 292 (e.g., $I_{sec}$) as a function of time, the waveform 520 represents the voltage 294 (e.g., the voltage 332) as a function of time, the waveform 530 represents the voltage 296 (e.g., the voltage 392) as a function of time, and the waveform 540 represents the voltage 248 as a function of time.

Figure 6:
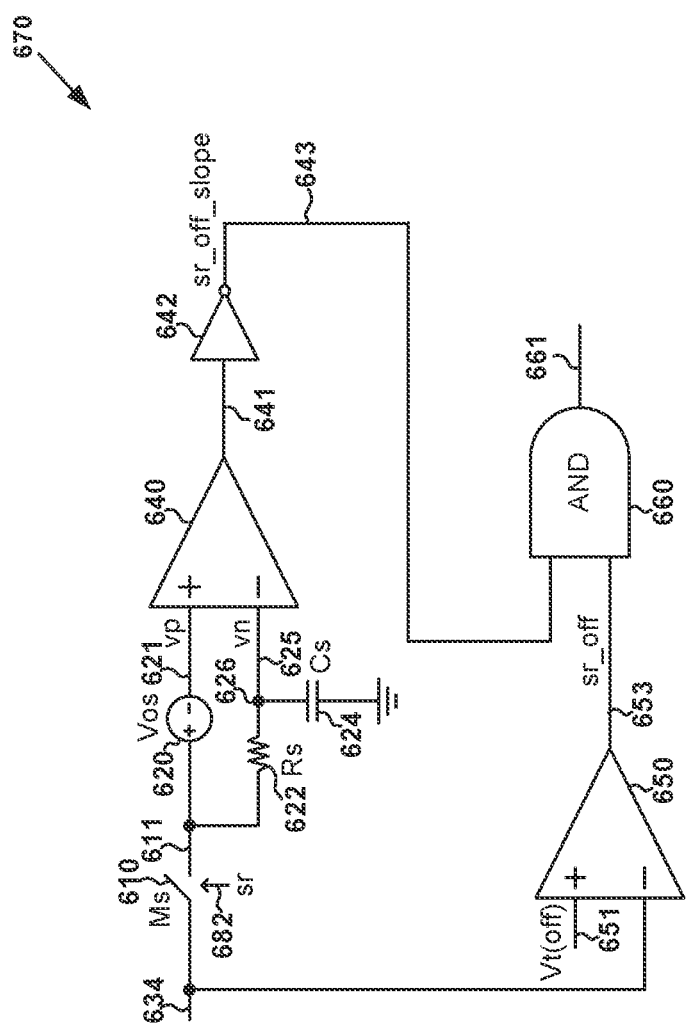
FIG. 6 is a simplified diagram showing a turn-off control component according to certain embodiments of the present invention.

FIG. 6 is a simplified diagram showing a turn-off control component according to certain embodiments of the present invention. This diagram is merely an example, which should not unduly limit the scope of the claims. One of ordinary skill in the art would recognize many variations, alternatives, and modifications. As shown in FIG. 6, the turn-off control component 670 includes a switch 610, a voltage adjustment component 620, a resistor 622, a capacitor 624, a comparator 640, an inverter 642 (e.g., a NOT gate), a comparator 650, and an AND gate 660 according to some embodiments. Although the above has been shown using a selected group of components for the turn-off control component 670, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the switch 610 (e.g., a transistor) receives a signal 682, which is used to close or open the switch 610. For example, the switch 610 is a transistor (e.g., a low-voltage transistor), which receives the signal 682 at the gate terminal of the transistor. As an example, if the signal 682 is at a logic high level, the switch 610 is closed. For example, if the signal 682 is at a logic low level, the switch 610 is opened. In certain embodiments, one terminal of the switch 610 receives a voltage 634, and another terminal of the switch 610 is biased at a voltage 611. For example, if the switch 610 is closed, the voltage 611 is equal to the voltage 634.

According to certain embodiments, the voltage 611 is received by the voltage adjustment component 620 (e.g., a voltage generator), which in response, generates a voltage 621. In some examples, the voltage 621 is equal to the voltage 611 minus a predetermined offset voltage (e.g., $V_{os}$). In certain examples, if the switch 610 is closed, $$V_{621} = V_{634} - V_{os} \qquad \text{(Equation 2)}$$

where $V_{621}$ represents the voltage 621, and $V_{634}$ represents the voltage 634. Additionally, $V_{os}$ represents the predetermined offset voltage. For example, the predetermined offset voltage (e.g., $V_{os}$) is equal to 25 mV.

According to some embodiments, the voltage 611 is received by one terminal of the resistor 622, and another terminal of the resistor 622 is connected to one terminal of the capacitor 624 through a node 626. For example, the node 626 is biased at a voltage 625. As an example, the other terminal of the capacitor 624 is biased to the ground voltage. In certain examples, the resistor 622 and the capacitor 624 are parts of an RC filter circuit. For example, the RC filter circuit has an RC time constant equal to 150 ns.

In some embodiments, the comparator 640 includes a non-inverting input terminal (e.g., a "+" input terminal) and an inverting input terminal (e.g., a "−" input terminal). For example, the non-inverting input terminal (e.g., vp) of the comparator 640 receives the voltage 621, and the inverting input terminal (e.g., vn) of the comparator 640 receives the voltage 625. As an example, the comparator 640 compares the voltage 621 and the voltage 625 and generates a comparison signal 641 based at least in part on the voltage 621 and the voltage 625. In certain embodiments, the comparison signal 641 is received by the inverter 642 (e.g., a NOT gate), which in response generates a signal 643 (e.g., sr_off_slope). For example, if the comparison signal 641 is at the logic high level, the signal 643 (e.g., sr_off_slope) is at the logic low level. As an example, if the comparison signal 641 is at the logic low level, the signal 643 (e.g., sr_off_slope) is at the logic high level.

As shown in FIG. 6, the comparator 650 includes a non-inverting input terminal (e.g., a "+" input terminal) and an inverting input terminal (e.g., a "−" input terminal) according to certain embodiments. For example, the non-inverting input terminal of the comparator 650 receives a predetermined threshold voltage 651 (e.g., $V_t$ (off)), and the inverting input terminal of the comparator 650 receives the voltage 634. As an example, the predetermined threshold voltage 651 (e.g., $V_t$ (off)) is equal to −20 mV. In some examples, the comparator 650 compares the predetermined threshold voltage 651 (e.g., $V_t$ (off)) and the voltage 634 and generates a comparison signal 653 (e.g., sr_off) based at least in part on the predetermined threshold voltage 651 and the voltage 634. According to some embodiments, the comparison signal 653 (e.g., sr_off) is received by the AND gate 660, which also receives the signal 643 (e.g., sr_off_slope). In certain examples, the AND gate 660 generates a signal 661 based at least in part on the signal 643 (e.g., sr_off_slope) and the comparison signal 653 (e.g., sr_off). For example, the signal 661 is at the logic high level only if the signal 643 (e.g., sr_off_slope) and the comparison signal 653 (e.g., sr_off) both are at the logic high level. As an example, if the signal 643 (e.g., sr_off_slope) and/or the comparison signal 653 (e.g., sr_off) is at the logic low level, the signal 661 is at the logic low level.

According to some embodiments, if the signal 682 is at the logic low level, the switch 610 is open. For example, if the switch 610 is open, the voltage 611 is equal to the voltage 625, but the voltage 621 is smaller than the voltage 625 by the predetermined offset voltage (e.g., $V_{os}$) that has a positive magnitude. As an example, if the voltage 621 is smaller than the voltage 625, the comparison signal 641 is at the logic low level and the signal 643 (e.g., sr_off_slope) is at the logic high level.

According to certain embodiments, if the signal 682 is at the logic high level, the switch 610 is closed. For example, when the switch 610 is closed, if the voltage 634 increases slowly, the voltage 625 follows the voltage 634 with a short delay, but at a given time the voltage 634 minus the voltage 625 is still smaller than the predetermined offset voltage (e.g., $V_{os}$) that has a positive magnitude, causing the voltage 621 to remain smaller than the voltage 625, the comparison signal 641 to remain at the logic low level, and the signal 643 (e.g., sr_off_slope) to remain at the logic high level. As an example, when the switch 610 is closed, if the voltage 634 increases rapidly, the voltage 625 cannot follow the voltage 634 with only a short delay, so at a given time the voltage 634 minus the voltage 625 becomes larger than the predetermined offset voltage (e.g., $V_{os}$) that has a positive magnitude, causing the voltage 621 to become larger than the voltage 625, the comparison signal 641 to change to the logic high level, and the signal 643 (e.g., sr_off_slope) to change to the logic low level.

Figure 7:
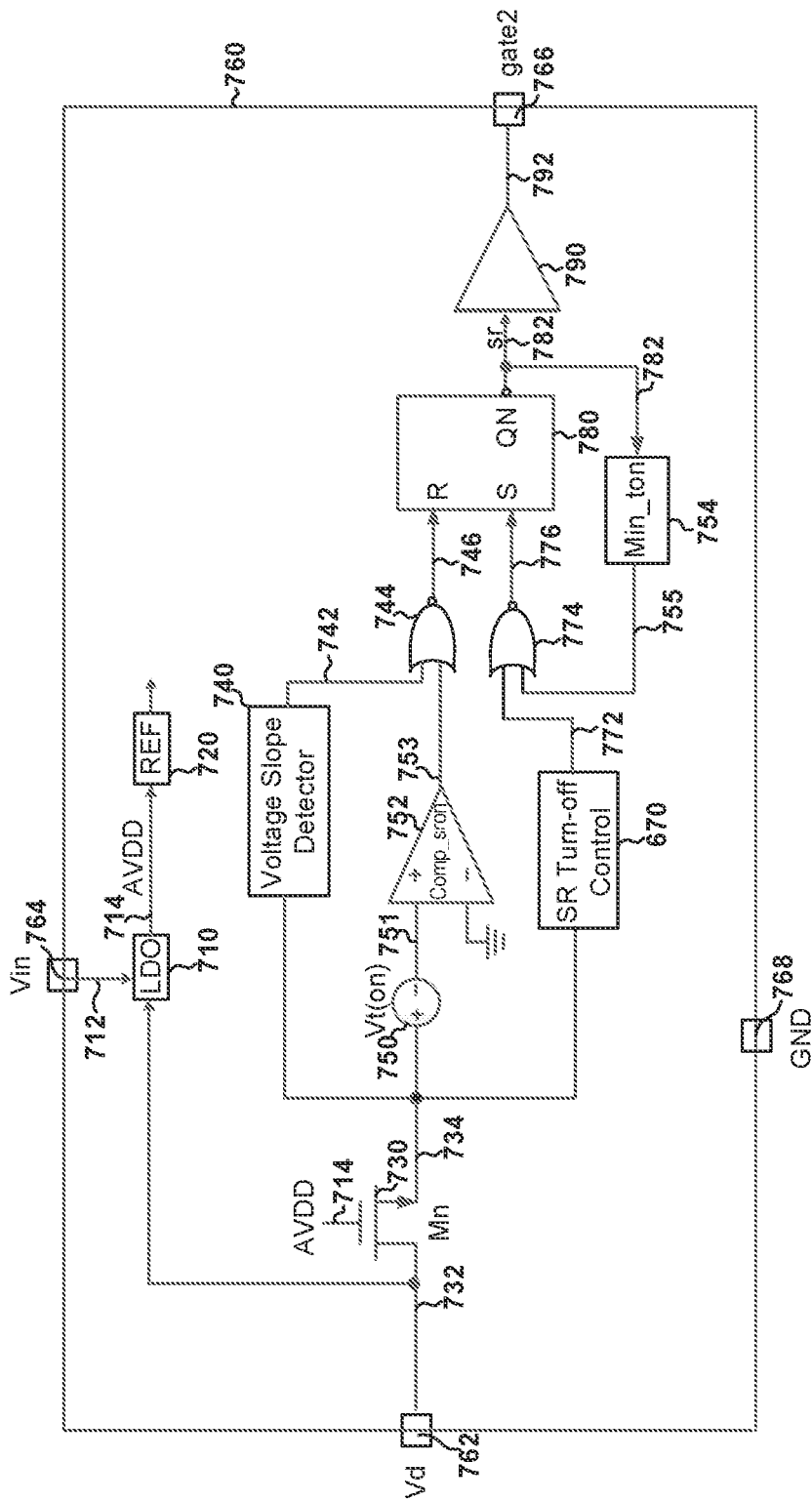
FIG. 7 is a simplified diagram showing a controller for synchronous rectification that includes the turn-off control component as shown in FIG. 6 according to some embodiments of the present invention.

FIG. 7 is a simplified diagram showing a controller for synchronous rectification that includes the turn-off control component 670 as shown in FIG. 6 according to some embodiments of the present invention. This diagram is merely an example, which should not unduly limit the scope of the claims. One of ordinary skill in the art would recognize many variations, alternatives, and modifications. As shown in FIG. 7, the controller 760 for synchronous rectification includes a terminal 762 (e.g., $V_d$), a terminal 764 (e.g., $V_{in}$), a terminal 766 (e.g., gate2), and a terminal 768 (e.g., GND) according to certain embodiments. Additionally, the controller 760 for synchronous rectification also includes a low-dropout regulator 710, a reference signal generator 720, a switch 730 (e.g., a transistor), a voltage slope detector 740, a NOR gate 744, a voltage adjustment component 750, a comparator 752, a minimum turn-on component 754, the turn-off control component 670, a NOR gate 774, a flip-flop 780, and a driver 790 according to some embodiments. For example, the controller 760 for synchronous rectification is a chip, and the terminal 762 (e.g., $V_d$), the terminal 764 (e.g., $V_{in}$), the terminal 766 (e.g., gate2), and the terminal 768 (e.g., GND) are pins. Although the above has been shown using a selected group of components for the controller 760 for synchronous rectification, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the low-dropout regulator 710 receives an input voltage 712 through the terminal 764 and a voltage 732 through the terminal 762 and generates a supply voltage 714 (e.g., AVDD) based at least in part on the input voltage 712 and/or the voltage 732. As an example, if the terminal 764 is not biased (e.g., floating electrically), the low-dropout regulator 710 generates the supply voltage 714 (e.g., AVDD) based at least in part on the voltage 732. For example, the supply voltage 714 is received by the reference signal generator 720, which in response generates one or more predetermined reference voltages (e.g., $V_{ref}$) and/or one or more predetermined reference currents (e.g., $I_{bias}$ and/or $I_s$). As an example, the supply voltage 714 is also received by the gate terminal of the transistor 730 (e.g., a high-voltage transistor). For example, the transistor 730 is turned on if the voltage 734 is smaller than the supply voltage 714 minus the threshold voltage of the transistor 730. In some examples, the drain terminal of the transistor 730 receives the voltage 732 through the terminal 762, and the source terminal of the transistor 730 is biased at a voltage 734. For example, if the transistor 730 is turned on by the supply voltage 714, the voltage 734 is equal to the voltage 732. As an example, the voltage 734 is received by the voltage slope detector 740, the voltage adjustment component 750, and the turn-off control component 670.

In some embodiments, the voltage adjustment component 750 receives the voltage 734 and generates a voltage 751 based at least in part on the voltage 734. For example, the voltage 751 is equal to the voltage 734 minus a predetermined threshold voltage (e.g., $V_t$ (on)), and the predetermined threshold voltage (e.g., $V_t$ (on)) is negative. As an example, if the transistor 730 is turned on, $$V_{751} = V_{732} - V_t(on) \qquad \text{(Equation 3)}$$

where $V_{751}$ represents the voltage 751, and $V_{732}$ represents the voltage 732. Additionally, $V_t$ (on) represents the predetermined threshold voltage, which has a negative value according to certain embodiments.

As shown in FIG. 7, the voltage 751 is received by the non-inverting input terminal (e.g., the "+" input terminal) of the comparator 752, which also includes an inverting input terminal (e.g., the "−" input terminal) according to some embodiments. For example, the inverting input terminal of the comparator 752 is biased to the ground voltage (e.g., the ground voltage on the secondary side of a power converter). As an example, based at least in part on the voltage 751 received by the non-inverting input terminal and the ground voltage received by the inverting input terminal, the comparator 752 generates a signal 753. For example, the signal 753 is at a logic high level if the voltage 751 is higher than the ground voltage, and the signal 753 is at a logic low level if the voltage 751 is lower than the ground voltage. As an example, the signal 753 is received by the NOR gate 744.

In certain examples, a signal 782 is received by the minimum turn-on component 754, which in response generates a signal 755 based at least in part on the signal 782. For example, if the signal 782 changes from the logic low level to the logic high level when the signal 755 is at the logic low level, the signal 755 changes from the logic low level to the logic high level. As an example, after the signal 755 changes from the logic low level to the logic high level, the signal 755 remains at the logic high level for at least a predetermined minimum turn-on time duration. For example, during the predetermined minimum turn-on time duration, the signal 755 remains at the logic high level, even if the signal 782 changes from the logic high level to the logic low level. As an example, the signal 755 is received by the NOR gate 774.

In some examples, the signal 755 prevents the signal 782 from changing from the logic high level to the logic low level during the predetermined minimum turn-on time duration immediately after the synchronous rectification system (e.g., the synchronous rectifier that includes the controller 760 for synchronous rectification) is turned on. For example, the predetermined minimum turn-on time duration is equal to 2 µs.

According to certain embodiments, the voltage slope detector 740 receives the voltage 734, detects the falling slope of the voltage 734, and generates a signal 742 based at least in part on the detected falling slope. As an example, the signal 742 is received by the NOR gate 744, which also receives the signal 753 and generates a signal 746 based at least in part on the signal 742 and the signal 753. For example, if the transistor 730 is turned on by the supply voltage 714, the voltage slope detector 740 receives the voltage 732, detects the falling slope of the voltage 732, and generates the signal 742 based at least in part on the detected falling slope. In some examples, the turn-off control component 670 receives the voltage 734 and generates a signal 772 based at least in part on the voltage 734. For example, as shown in FIG. 6, the turn-off control component 670 receives the voltage 734 as the voltage 634 and generates the signal 661 as the signal 772. As an example, the voltage 734 is the same as the voltage 634, and the signal 772 is the same as the signal 661. In certain examples, if the transistor 730 is turned on by the supply voltage 714, the turn-off control component 670 receives the voltage 732 and generates the signal 772 based at least in part on the voltage 732. For example, if the transistor 730 is turned on by the supply voltage 714, the voltage 732 is the same as the voltage 634. As an example, the signal 772 is the same as the signal 661. In some examples, the signal 772 is received by the NOR gate 774, which also receives the signal 755 and generates a signal 776 based at least in part on the signal 755 and the signal 772.

As shown in FIG. 7, the signal 746 and the signal 776 are received by the flip-flop 780, which in response generates the signal 782 (e.g., sr) based at least in part on the signal 746 and the signal 776 according to some embodiments. In certain examples, the flip-flop 780 includes an R terminal, an S terminal, and a QN terminal. For example, the R terminal receives the signal 746, the S terminal receives the signal 776, and the QN terminal outputs the signal 782 (e.g., sr). As an example, the driver 790 receives the signal 782 (e.g., sr), generates a voltage 792 (e.g., a drive voltage) based at least in part on the signal 782, and sends out the voltage 792 through the terminal 766. In some examples, if the signal 782 (e.g., sr) is at the logic high level, the voltage 792 is at the high voltage level, and if the signal 782 (e.g., sr) is at the logic low level, the voltage 792 is at the low voltage level.

According to certain embodiments, if the signal 643 (e.g., sr_off_slope) and/or the comparison signal 653 (e.g., sr_off) is at the logic low level, the voltage 792 is at the low voltage level in order to turn off the synchronous rectification system (e.g., the synchronous rectifier) that includes the controller 760 for synchronous rectification. For example, in the deep continuous conduction mode (DCCM), the signal 643 (e.g., sr_off_slope) causes the synchronous rectification system (e.g., the synchronous rectifier) to be turned off. As an example, in the discontinuous conduction mode (DCM) and the shallow continuous conduction mode (SCCM), the comparison signal 653 (e.g., sr_off) causes the synchronous rectification system (e.g., the synchronous rectifier) to be turned off.

As shown in FIG. 6 and FIG. 7, the voltage 634 is the same as the voltage 734, the signal 661 is the same as the signal 772, and the ground voltage received by the capacitor 624 is the same as the ground voltage received by the inverting input terminal of the comparator 752, according to certain embodiments. In some examples, if the signal 776 is at the logic high level, the signal 782 is at the logic low level, causing the voltage 792 to be at the low voltage level in order to turn off the synchronous rectification system (e.g., the synchronous rectifier). In certain examples, if the signal 746 is at the logic high level, the signal 782 is at the logic high level, causing the voltage 792 to be at the high voltage level in order to turn on the synchronous rectification system (e.g., the synchronous rectifier).

As discussed above and further emphasized here, FIG. 7 is merely an example, which should not unduly limit the scope of the claims. One of ordinary skill in the art would recognize many variations, alternatives, and modifications. In some examples, the controller 760 for synchronous rectification is used to replace the controller 160 for synchronous rectification (e.g., a controller chip U2) of the flyback power converter 100 to form a different flyback power converter. As an example, in this different flyback power converter, one terminal of the secondary winding 112 is connected to the cathode of the body diode 190, the drain terminal of the transistor 180 (e.g., the MOSFET MS2), and the terminal 762 (e.g., $V_d$) of the controller 760 for synchronous rectification, another terminal of the secondary winding 112 is connected to one terminal of the capacitor 170 (e.g., $C_{out}$) and is also connected to the terminal 764 (e.g., $V_{in}$) of the controller 760 for synchronous rectification, the gate terminal of the transistor 180 (e.g., the MOSFET MS2) is connected to the terminal 766 (e.g., gate2) of the controller 760 for synchronous rectification, and another terminal of the capacitor 170 (e.g., $C_{out}$), the source terminal of the transistor 180 (e.g., the MOSFET MS2), and the terminal 768 (e.g., GND) of the controller 760 for synchronous rectification all are biased to the ground voltage on the secondary side.

In certain examples, the controller 760 for synchronous rectification is used to replace the controller 260 for synchronous rectification (e.g., a controller chip U2) of the flyback power converter 200 to form a different flyback power converter. As an example, in this different flyback power converter, the controller 760 for synchronous rectification receives the voltage 294 through the terminal 762 (e.g., $V_d$) from the drain terminal of the transistor 280 (e.g., the MOSFET MS2), and outputs the voltage 296 through the terminal 766 (e.g., gate2) to the gate terminal of the transistor 280 (e.g., the MOSFET MS2), one terminal of the secondary winding 212 is connected to the anode of the body diode 290, the source terminal of the transistor 280 (e.g., the MOSFET MS2), and the terminal 768 (e.g., GND) of the controller 760 for synchronous rectification, and the terminal 764 (e.g., $V_{in}$) of the controller 760 for synchronous rectification is not biased (e.g., floating electrically).

Figure 8:
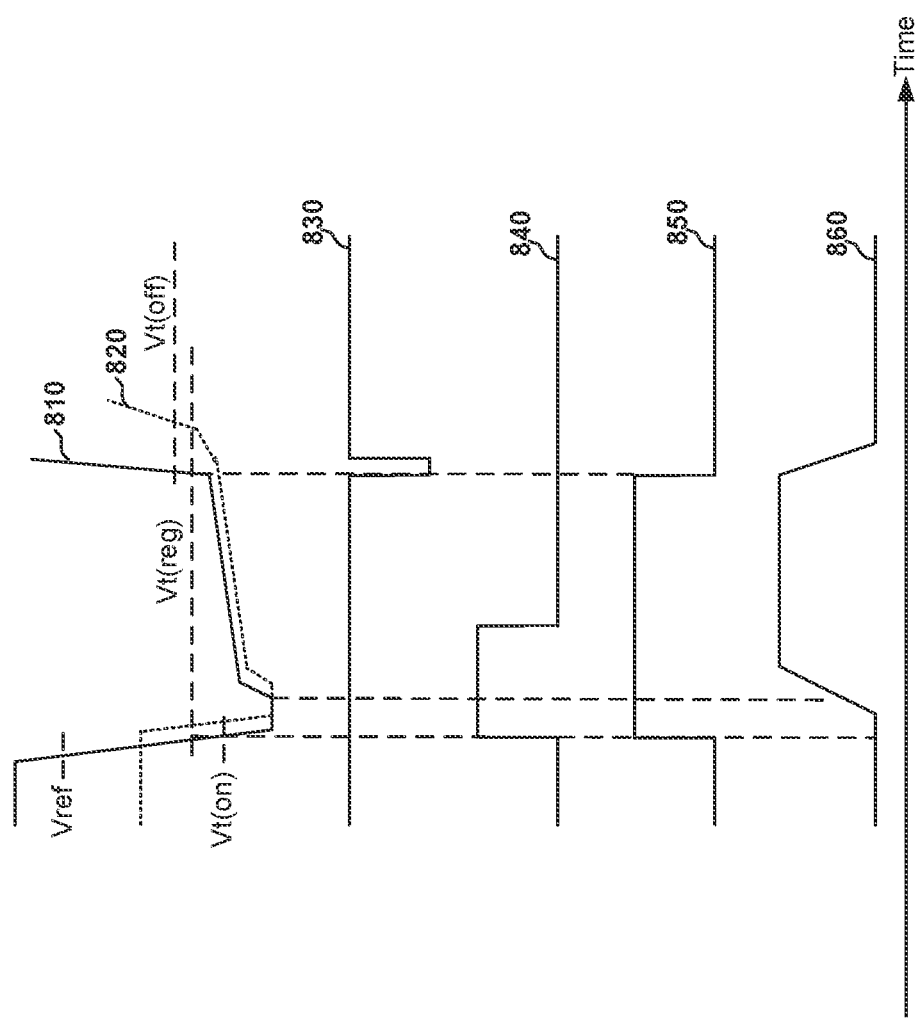
FIG. 8 shows simplified timing diagrams related to the controller for synchronous rectification including the turn-off control component as shown in FIG. 6 and FIG. 7 according to some embodiments of the present invention.

FIG. 8 shows simplified timing diagrams related to the controller 760 for synchronous rectification including the turn-off control component 670 as shown in FIG. 6 and FIG. 7 according to some embodiments of the present invention. These diagrams are merely examples, which should not unduly limit the scope of the claims. One of ordinary skill in the art would recognize many variations, alternatives, and modifications. As shown in FIG. 8, the waveform 810 represents the voltage 732 as a function of time, the waveform 820 represents the voltage 625 as a function of time, the waveform 830 represents the signal 643 (e.g., sr_off_slope) as a function of time, the waveform 840 represents the signal 755 as a function of time, the waveform 850 represents the signal 782 (e.g., sr) as a function of time, and the waveform 860 represents the voltage 792 as a function of time.

As shown in FIG. 6 and FIG. 7, if the signal 782, which is the same as the signal 682, is at the logic low level, the switch 610 is open and the comparison signal 641 is at the logic low level according to certain embodiments. For example, if the comparison signal 641 is at the logic low level, the signal 643 (e.g., sr_off_slope) is at the logic high level. According to some embodiments, if the signal 782, which is the same as the signal 682, is at the logic high level, the switch 610 is closed and the voltage 634 is equal to the voltage 611. For example, if the switch 610 is closed, the voltage 621 depends on the voltage 634 according to Equation 2, and the voltage 625 also depends on the voltage 634 through the RC filter circuit including the resistor 622 and the capacitor 624.

As shown by the waveforms 810 and 820, the voltage 625 follows the voltage 732 with a delay during the demagnetization process, wherein the voltage 732 is the same as the voltage 634 if the switch 730 is closed (e.g., the transistor being turned on) according to some embodiments. For example, the delay is related to the RC time constant of the RC filter circuit. As an example, if the primary side of the power converter that includes the controller 760 for synchronous rectification is turned on suddenly, the voltage 732 increases rapidly. In some examples, with such rapid increase of the voltage 732, the voltage 625 cannot follows the voltage 732 closely. For example, when the switch 730 and the switch 610 both are closed, if the voltage 732 minus the voltage 625 becomes larger than the predetermined offset voltage (e.g., $V_{os}$), the comparison signal 641 changes from the logic low level to the logic high level. As an example, if the comparison signal 641 is at the logic high level, the signal 643 (e.g., sr_off_slope) is at the logic low level.

As discussed above and further emphasized here, FIG. 6 is merely an example, which should not unduly limit the scope of the claims. One of ordinary skill in the art would recognize many variations, alternatives, and modifications. For example, the voltage adjustment component 620 is a part of the comparator 640, and the comparator 640 includes the voltage adjustment component 620 as shown in FIG. 9.

Figure 9:
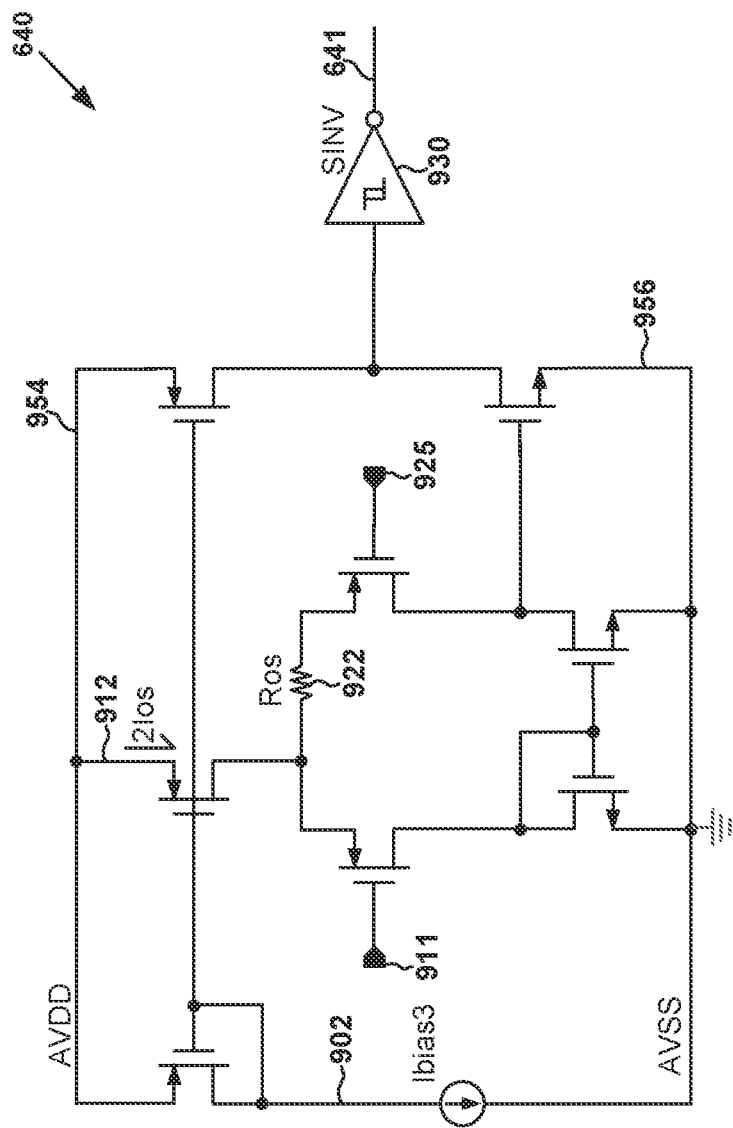
FIG. 9 is a simplified diagram showing the comparator that includes the voltage adjustment component as part of the turn-off control component as shown in FIG. 6 according to certain embodiments of the present invention.

FIG. 9 is a simplified diagram showing the comparator 640 that includes the voltage adjustment component 620 as part of the turn-off control component 670 as shown in FIG. 6 according to certain embodiments of the present invention. This diagram is merely an example, which should not unduly limit the scope of the claims. One of ordinary skill in the art would recognize many variations, alternatives, and modifications. As shown in FIG. 9, the comparator 640 includes a resistor 922 and a Schmitt inverter 930 according to some embodiments. For example, a voltage 954 is the same as the supply voltage 714 (e.g., AVDD), and a voltage 956 is the same as the ground voltage received by the capacitor 624. As an example, a current 902 is a bias current, and a current 912 is also shown in FIG. 9.

In some examples, the predetermined offset voltage of the voltage adjustment component 620 is determined as follows:

$$V_{os}=R_{os} \times I_{os} \qquad \text{(Equation 4)}$$

where $V_{os}$ represents the predetermined offset voltage of the voltage adjustment component 620, $R_{os}$ represents the resistance of the resistor 922, and $I_{os}$ represents one half of the magnitude of the current 912. In certain examples, a terminal 911 receives the voltage 611, and a terminal 925 receives the voltage 625. For example, the Schmitt inverter 930 outputs the comparison signal 641.

As discussed above and further emphasized here, FIG. 6 is merely an example, which should not unduly limit the scope of the claims. One of ordinary skill in the art would recognize many variations, alternatives, and modifications. For example, the comparator 650 receives the supply voltage 714 (e.g., AVDD), and the comparator 650 also includes one or more components that use the received supply voltage 714 (e.g., AVDD) to generate the predetermined threshold voltage 651 (e.g., $V_t$ (off)) as shown in FIG. 10.

Figure 10:
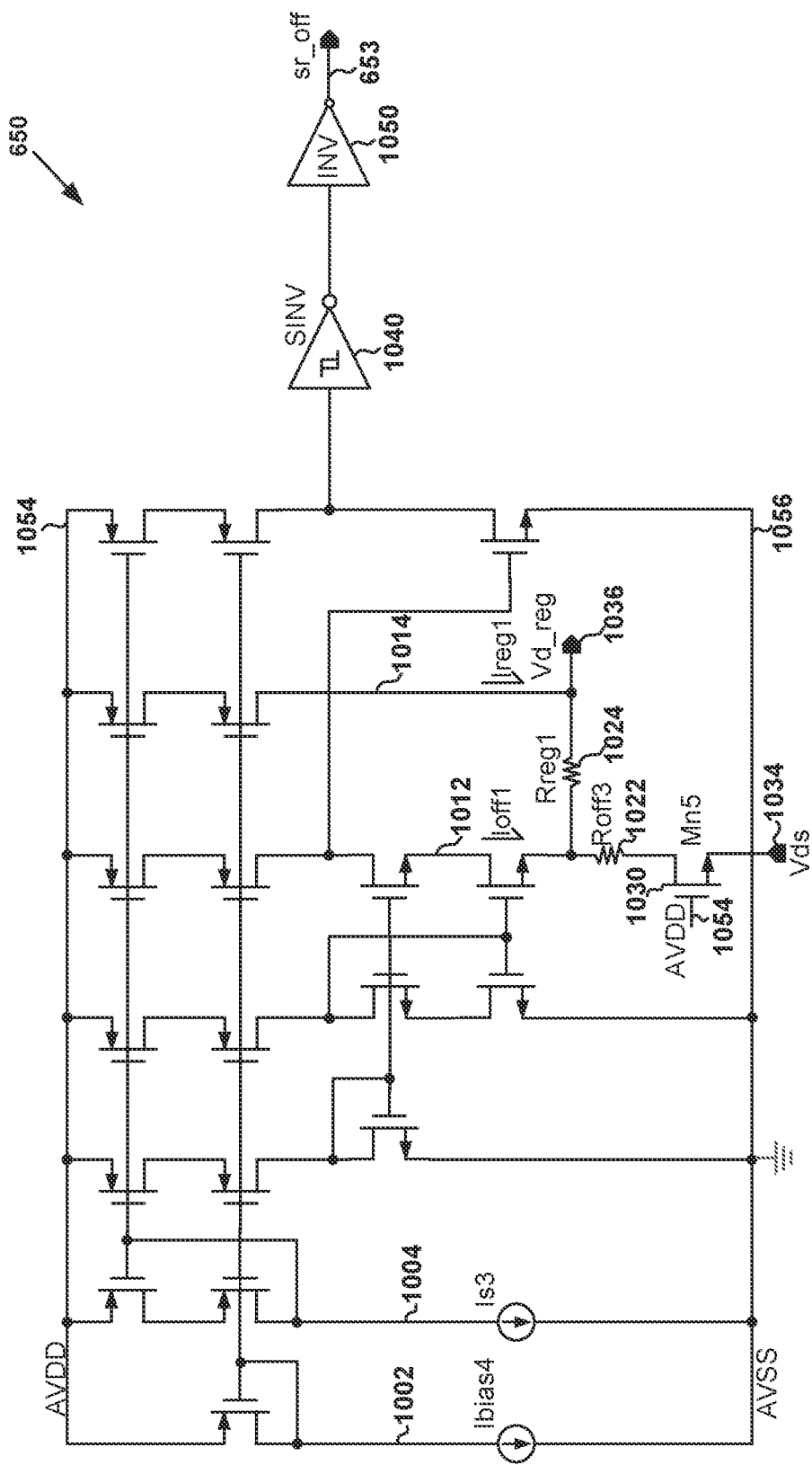
FIG. 10 is a simplified diagram showing the comparator as part of the turn-off control component as shown in FIG. 6 according to certain embodiments of the present invention.

FIG. 10 is a simplified diagram showing the comparator 650 as part of the turn-off control component 670 as shown in FIG. 6 according to certain embodiments of the present invention. This diagram is merely an example, which should not unduly limit the scope of the claims. One of ordinary skill in the art would recognize many variations, alternatives, and modifications. As shown in FIG. 10, the comparator 650 includes resistors 1022 and 1024, a transistor 1030 (e.g., a high-voltage transistor), a Schmitt inverter 1040, and an inverter 1050 (e.g., a NOT gate) according to some embodiments. For example, a voltage 1054 is the same as the supply voltage 714 (e.g., AVDD), and a voltage 1056 is the same as the ground voltage received by the capacitor 624. As an example, currents 1002 and 1004 are bias currents, and currents 1012 and 1014 are also shown in FIG. 10.

According to certain embodiments, a terminal 1034 receives the voltage 634, and the inverter 1050 (e.g., a NOT gate) outputs the comparison signal 653 (e.g., sr_off). For example, the Schmitt inverter 1040 and the inverter 1050 (e.g., a NOT gate) are in series. In certain examples, the gate terminal of the transistor 1030 receives the voltage 1054 and another terminal of the transistor 1030 receives the voltage 634 through the terminal 1034. As an example, the transistor 1030 is turned on if the voltage 634 is smaller than the supply voltage 1054 minus the threshold voltage of the transistor 1030.

In some examples, the predetermined threshold voltage 651 is determined as follows:

$$V_t(off)=-R_{off3} \times I_{off1} \qquad \text{(Equation 5)}$$

where $V_t$ (off) represents the predetermined threshold voltage 651, $R_{off3}$ represents the resistance of the resistor 1022, and $I_{off1}$ represents the magnitude of the current 1012.

In certain embodiments, a terminal 1036 is biased to a voltage as follows:

$$V_t(reg)=-(R_{off3} \times (I_{off1}+I_{reg1})+R_{reg1} \times I_{reg1}) \qquad \text{(Equation 6)}$$

where $V_t$ (reg) represents the voltage to which the terminal 1036 is biased. Additionally, $R_{off3}$ represents the resistance of the resistor 1022, $I_{off1}$ represents the magnitude of the current 1012, and I$_{reg1}$ represents the magnitude of the current 1014. Also, R$_{reg1}$ represents the resistance of the resistor 1024.

Figure 11:
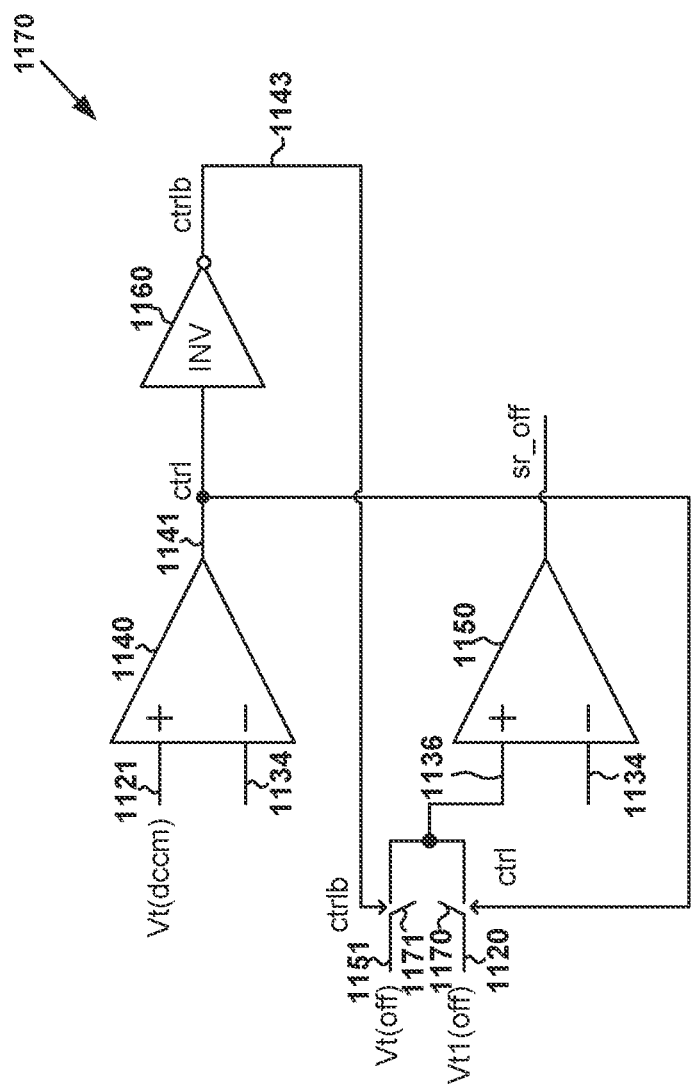
FIG. 11 is a simplified diagram showing a turn-off control component according to certain embodiments of the present invention.

FIG. 11 is a simplified diagram showing a turn-off control component according to certain embodiments of the present invention. This diagram is merely an example, which should not unduly limit the scope of the claims. One of ordinary skill in the art would recognize many variations, alternatives, and modifications. As shown in FIG. 11, the turn-off control component 1170 includes comparators 1140 and 1150, an inverter 1160 (e.g., a NOT gate), and switches 1170 and 1171 according to some embodiments. For example, the switches 1170 and 1171 are parts of a voltage selector. Although the above has been shown using a selected group of components for the turn-off control component 1170, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the comparator 1140 includes a non-inverting input terminal (e.g., a "+" input terminal) and an inverting input terminal (e.g., a "−" input terminal). For example, the non-inverting input terminal (e.g., a "+" input terminal) of the comparator 1140 receives a predetermined threshold voltage 1121 (e.g., V$_t$ (dccm)), and the inverting input terminal (e.g., a "−" input terminal) of the comparator 1140 receives a voltage 1134. As an example, the predetermined threshold voltage 1121 (e.g., V$_t$ (dccm)) has a negative value of −80 mV. In certain examples, the comparator 1140 compares the predetermined threshold voltage 1121 and the voltage 1134 and generates a comparison signal 1141 based at least in part on the predetermined threshold voltage 1121 and the voltage 1134. For example, if the voltage 1134 changes from being smaller than the predetermined threshold voltage 1121 to being larger than the predetermined threshold voltage 1121, the comparison signal 1141 changes from the logic high level to the logic low level after a predetermined delay (e.g., a delay for the falling edge of the comparison signal 1141). As an example, if the voltage 1134 changes from being larger than the predetermined threshold voltage 1121 to being smaller than the predetermined threshold voltage 1121, the comparison signal 1141 changes from the logic low level to the logic high level after a predetermined delay (e.g., a delay for the rising edge of the comparison signal 1141).

In certain embodiments, the comparison signal 1141 is received by the inverter 1160 (e.g., a NOT gate), which in response generates a signal 1143 (e.g., ctrlb). For example, if the comparison signal 1141 is at the logic high level, the signal 1143 (e.g., ctrlb) is at the logic low level. As an example, if the comparison signal 1141 is at the logic low level, the signal 1143 (e.g., ctrlb) is at the logic high level.

According to certain embodiments, the switch 1170 receives the comparison signal 1141 and the switch 1171 receives the signal 1143 (e.g., ctrlb). In some examples, if the comparison signal 1141 is at the logic high level, the switch 1170 is closed, and if the comparison signal 1170 is at the logic low level, the switch 1170 is open. In certain examples, if the signal 1143 (e.g., ctrlb) is at the logic high level, the switch 1171 is closed, and if the signal 1143 (e.g., ctrlb) is at the logic low level, the switch 1171 is open. For example, if the predetermined threshold voltage 1121 is larger than the voltage 1134, the comparison signal 1141 is at the logic high level and the signal 1143 (e.g., ctrlb) is at the logic low level, so the switch 1170 is closed but the switch 1171 is open. As an example, if the predetermined threshold voltage 1121 is smaller than the voltage 1134, the comparison signal 1141 is at the logic low level and the signal 1143 (e.g., ctrlb) is at the logic high level, so the switch 1170 is open but the switch 1171 is closed.

According to some embodiments, one terminal of the switch 1170 receives a predetermined threshold voltage 1120 (e.g., V$_{t1}$ (off)) and another terminal of the switch 1170 is biased at a voltage 1136, and one terminal of the switch 1171 receives a predetermined threshold voltage 1151 (e.g., V$_t$ (off)) and another terminal of the switch 1171 is biased at the voltage 1136. As an example, the predetermined threshold voltage 1120 (e.g., V$_{t1}$ (off)) is smaller than the predetermined threshold voltage 1151 (e.g., V$_t$ (off)). For example, the predetermined threshold voltage 1120 (e.g., V$_{t1}$ (off)) is equal to −60 mV, and the predetermined threshold voltage 1151 (e.g., V$_t$ (off)) is equal to −20 mV. In certain examples, if the switch 1170 is closed but the switch 1171 is open, the voltage 1136 is the same as the predetermined threshold voltage 1120 (e.g., V$_{t1}$ (off)). In some examples, if the switch 1170 is open but the switch 1171 is closed, the voltage 1136 is the same as the predetermined threshold voltage 1151 (e.g., V$_t$ (off)).

In certain embodiments, the comparator 1150 includes a non-inverting input terminal (e.g., a "+" input terminal) and an inverting input terminal (e.g., a "−" input terminal). For example, the non-inverting input terminal (e.g., a "+" input terminal) of the comparator 1150 receives the voltage 1136, and the inverting input terminal (e.g., a "−" input terminal) of the comparator 1150 receives the voltage 1134. As an example, the comparator 1150 compares the voltage 1136 and the voltage 1134 and generates a comparison signal 1153 based at least in part on the voltage 1136 and the voltage 1134. For example, if the voltage 1134 changes from being smaller than the voltage 1136 to being larger than the voltage 1136, the comparison signal 1153 changes from the logic high level to the logic low level without any delay. As an example, if the voltage 1134 changes from being larger than the voltage 1136 to being smaller than the voltage 1136, the comparison signal 1153 changes from the logic low level to the logic high level without any delay. In some examples, if the predetermined threshold voltage 1121 is larger than the voltage 1134, the voltage 1136 is the same as the predetermined threshold voltage 1120 (e.g., V$_{t1}$ (off)). In certain examples, if the predetermined threshold voltage 1121 is lower than the voltage 1134, the voltage 1136 is the same as the predetermined threshold voltage 1151 (e.g., V$_t$ (off)).

Figure 12:
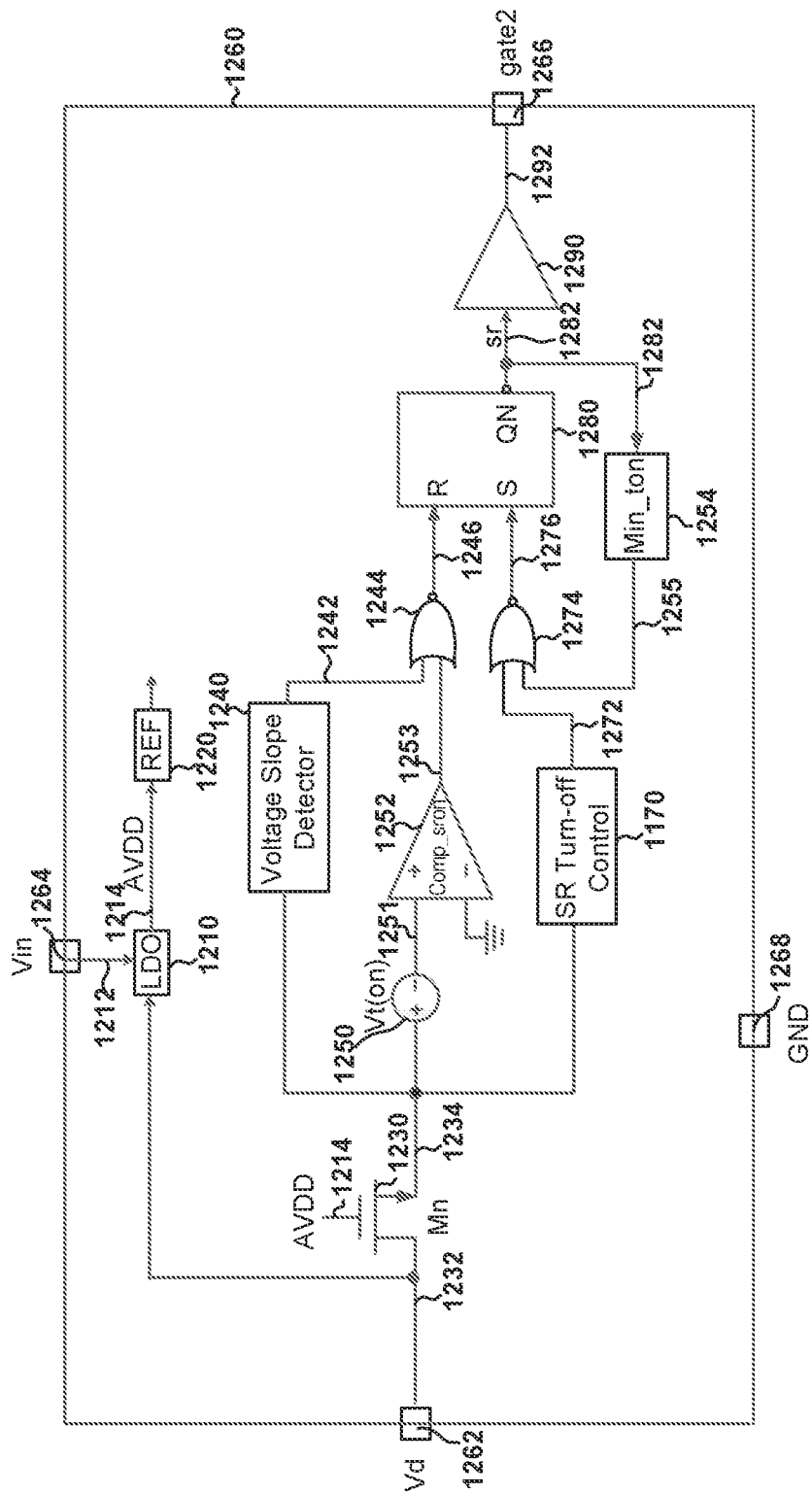
FIG. 12 is a simplified diagram showing a controller for synchronous rectification that includes the turn-off control component as shown in FIG. 11 according to certain embodiments of the present invention.

FIG. 12 is a simplified diagram showing a controller for synchronous rectification that includes the turn-off control component 1170 as shown in FIG. 11 according to certain embodiments of the present invention. This diagram is merely an example, which should not unduly limit the scope of the claims. One of ordinary skill in the art would recognize many variations, alternatives, and modifications. As shown in FIG. 12, the controller 1260 for synchronous rectification includes a terminal 1262 (e.g., V$_d$), a terminal 1264 (e.g., V$_{in}$), a terminal 1266 (e.g., gate2), and a terminal 1268 (e.g., GND) according to some embodiments. Additionally, the controller 1260 for synchronous rectification also includes a low-dropout regulator 1210, a reference signal generator 1220, a switch 1230 (e.g., a transistor), a voltage slope detector 1240, a NOR gate 1244, a voltage adjustment component 1250, a comparator 1252, a minimum turn-on component 1254, the turn-off control component 1170, a NOR gate 1274, a flip-flop 1280, and a driver 1290 according to certain embodiments. For example, the controller 1260 for synchronous rectification is a chip, and the terminal 1262 (e.g., $V_d$), the terminal 1264 (e.g., $V_{in}$), the terminal 1266 (e.g., gate2), and the terminal 1268 (e.g., GND) are pins. Although the above has been shown using a selected group of components for the controller 1260 for synchronous rectification, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In certain embodiments, the low-dropout regulator 1210 receives an input voltage 1212 through the terminal 1264 and a voltage 1232 through the terminal 1262 and generates a supply voltage 1214 (e.g., AVDD) based at least in part on the input voltage 1212 and/or the voltage 1232. As an example, if the terminal 1264 is not biased (e.g., floating electrically), the low-dropout regulator 1210 generates the supply voltage 1214 (e.g., AVDD) based at least in part on the voltage 1232. For example, the supply voltage 1214 is received by the reference signal generator 1220, which in response generates one or more predetermined reference voltages (e.g., $V_{ref}$) and/or one or more predetermined reference currents (e.g., $I_{bias}$ and/or $I_s$). As an example, the supply voltage 1214 is also received by the gate terminal of the transistor 1230 (e.g., a high-voltage transistor). For example, the transistor 1230 is turned on if the voltage 1234 is smaller than the supply voltage 1214 minus the threshold voltage of the transistor 1230. In some examples, the drain terminal of the transistor 1230 receives the voltage 1232 through the terminal 1262, and the source terminal of the transistor 1230 is biased at a voltage 1234. For example, if the transistor 1230 is turned on by the supply voltage 1214, the voltage 1234 is equal to the voltage 1232. As an example, the voltage 1234 is received by the voltage slope detector 1240, the voltage adjustment component 1250, and the turn-off control component 1170.

In some embodiments, the voltage adjustment component 1250 receives the voltage 1234 and generates a voltage 1251 based at least in part on the voltage 1234. For example, the voltage 1251 is equal to the voltage 1234 minus a predetermined threshold voltage (e.g., $V_t$ (on)), and the predetermined threshold voltage (e.g., $V_t$ (on)) is negative. As an example, if the transistor 1230 is turned on, $$V_{1251} = V_{1232} - V_t(on) \quad \text{(Equation 7)}$$

where $V_{1251}$ represents the voltage 1251, and $V_{1232}$ represents the voltage 1232. Additionally, $V_t$ (on) represents the predetermined threshold voltage, which has a negative value according to certain embodiments.

As shown in FIG. 12, the voltage 1251 is received by the non-inverting input terminal (e.g., the "+" input terminal) of the comparator 1252, which also includes an inverting input terminal (e.g., the "−" input terminal) according to some embodiments. For example, the inverting input terminal of the comparator 1252 is biased to the ground voltage (e.g., the ground voltage on the secondary side of a power converter). As an example, based at least in part on the voltage 1251 received by the non-inverting input terminal and the ground voltage received by the inverting input terminal, the comparator 1252 generates a signal 1253. For example, the signal 1253 is at a logic high level if the voltage 1251 is higher than the ground voltage, and the signal 1253 is at a logic low level if the voltage 1251 is lower than the ground voltage. As an example, the signal 1253 is received by the NOR gate 1244.

In certain examples, a signal 1282 is received by the minimum turn-on component 1254, which in response generates a signal 1255 based at least in part on the signal 1282. For example, if the signal 1282 changes from the logic low level to the logic high level when the signal 1255 is at the logic low level, the signal 1255 changes from the logic low level to the logic high level. As an example, after the signal 1255 changes from the logic low level to the logic high level, the signal 1255 remains at the logic high level for at least a predetermined minimum turn-on time duration. For example, during the predetermined minimum turn-on time duration, the signal 1255 remains at the logic high level, even if the signal 1282 changes from the logic high level to the logic low level. As an example, the signal 1255 is received by the NOR gate 1274.

In some examples, the signal 1255 prevents the signal 1282 from changing from the logic high level to the logic low level during the predetermined minimum turn-on time duration immediately after the synchronous rectification system (e.g., the synchronous rectifier that includes the controller 1260 for synchronous rectification) is turned on. For example, the predetermined minimum turn-on time duration is equal to 2 μs.

According to certain embodiments, the voltage slope detector 1240 receives the voltage 1234, detects the falling slope of the voltage 1234, and generates a signal 1242 based at least in part on the detected falling slope. As an example, the signal 1242 is received by the NOR gate 1244, which also receives the signal 1253 and generates a signal 1246 based at least in part on the signal 1242 and the signal 1253. For example, if the transistor 1230 is turned on by the supply voltage 1214, the voltage slope detector 1240 receives the voltage 1232, detects the falling slope of the voltage 1232, and generates the signal 1242 based at least in part on the detected falling slope. In some examples, the turn-off control component 1170 receives the voltage 1234 and generates a signal 1272 based at least in part on the voltage 1234. For example, as shown in FIG. 11, the turn-off control component 1170 receives the voltage 1234 as the voltage 1134 and generates the signal 1153 as the signal 1272. As an example, the voltage 1234 is the same as the voltage 1134, and the signal 1272 is the same as the signal 1153. In certain examples, if the transistor 1230 is turned on by the supply voltage 1214, the turn-off control component 1170 receives the voltage 1232 and generates the signal 1272 based at least in part on the voltage 1232. For example, if the transistor 1230 is turned on by the supply voltage 1214, the voltage 1232 is the same as the voltage 1134. As an example, the signal 1272 is the same as the signal 1153. In some examples, the signal 1272 is received by the NOR gate 1274, which also receives the signal 1255 and generates a signal 1276 based at least in part on the signal 1255 and the signal 1272.

As shown in FIG. 12, the signal 1246 and the signal 1276 are received by the flip-flop 1280, which in response generates the signal 1282 (e.g., sr) based at least in part on the signal 1246 and the signal 1276 according to some embodiments. In certain examples, the flip-flop 1280 includes an R terminal, an S terminal, and a QN terminal. For example, the R terminal receives the signal 1246, the S terminal receives the signal 1276, and the QN terminal outputs the signal 1282 (e.g., sr). As an example, the driver 1290 receives the signal 1282 (e.g., sr), generates a voltage 1292 (e.g., a drive voltage) based at least in part on the signal 1282, and sends out the voltage 1292 through the terminal 1266. In some examples, if the signal 1282 (e.g., sr) is at the logic high level, the voltage 1292 is at the high voltage level, and if the signal 1282 (e.g., sr) is at the logic low level, the voltage 1292 is at the low voltage level.

As shown in FIG. 11 and FIG. 12, the voltage 1134 is the same as the voltage 1234, the signal 1153 is the same as the signal 1272 according to certain embodiments. In some examples, if the signal 1276 is at the logic high level, the signal 1282 is at the logic low level, causing the voltage 1292 to be at the low voltage level in order to turn off the synchronous rectification system (e.g., the synchronous rectifier). In certain examples, if the signal 1246 is at the logic high level, the signal 1282 is at the logic high level, causing the voltage 1292 to be at the high voltage level in order to turn on the synchronous rectification system (e.g., the synchronous rectifier).

As discussed above and further emphasized here, FIG. 12 is merely an example, which should not unduly limit the scope of the claims. One of ordinary skill in the art would recognize many variations, alternatives, and modifications. In some examples, the controller 1260 for synchronous rectification is used to replace the controller 160 for synchronous rectification (e.g., a controller chip U2) of the flyback power converter 100 to form a different flyback power converter. As an example, in this different flyback power converter, one terminal of the secondary winding 112 is connected to the cathode of the body diode 190, the drain terminal of the transistor 180 (e.g., the MOSFET MS2), and the terminal 1262 (e.g., $V_d$) of the controller 1260 for synchronous rectification, another terminal of the secondary winding 112 is connected to one terminal of the capacitor 170 (e.g., $C_{out}$) and is also connected to the terminal 1264 (e.g., $V_{in}$) of the controller 1260 for synchronous rectification, the gate terminal of the transistor 180 (e.g., the MOSFET MS2) is connected to the terminal 1266 (e.g., gate2) of the controller 1260 for synchronous rectification, and another terminal of the capacitor 170 (e.g., $C_{out}$), the source terminal of the transistor 180 (e.g., the MOSFET MS2), and the terminal 1268 (e.g., GND) of the controller 1260 for synchronous rectification all are biased to the ground voltage on the secondary side.

In certain examples, the controller 1260 for synchronous rectification is used to replace the controller 260 for synchronous rectification (e.g., a controller chip U2) of the flyback power converter 200 to form a different flyback power converter. As an example, in this different flyback power converter, the controller 1260 for synchronous rectification receives the voltage 294 through the terminal 1262 (e.g., $V_d$) from the drain terminal of the transistor 280 (e.g., the MOSFET MS2), and outputs the voltage 296 through the terminal 1266 (e.g., gate2) to the gate terminal of the transistor 280 (e.g., the MOSFET MS2), one terminal of the secondary winding 212 is connected to the anode of the body diode 290, the source terminal of the transistor 280 (e.g., the MOSFET MS2), and the terminal 1268 (e.g., GND) of the controller 1260 for synchronous rectification, and the terminal 1264 (e.g., $V_{in}$) of the controller 1260 for synchronous rectification is not biased (e.g., floating electrically).

Figure 13:
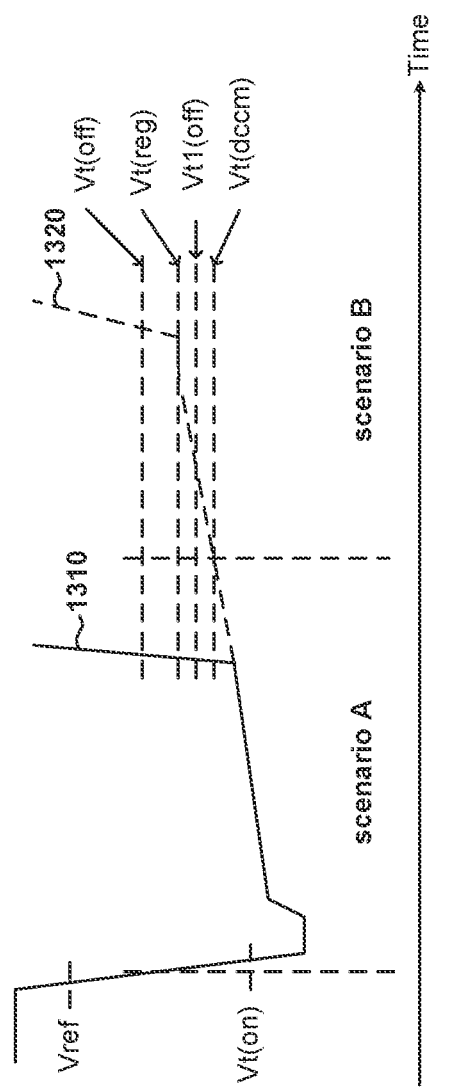
FIG. 13 shows simplified timing diagrams related to the controller for synchronous rectification including the turn-off control component as shown in FIG. 11 and FIG. 12 according to some embodiments of the present invention.

FIG. 13 shows simplified timing diagrams related to the controller 1260 for synchronous rectification including the turn-off control component 1170 as shown in FIG. 11 and FIG. 12 according to some embodiments of the present invention. These diagrams are merely examples, which should not unduly limit the scope of the claims. One of ordinary skill in the art would recognize many variations, alternatives, and modifications. As shown in FIG. 13, the waveform 1310 represents the voltage 1232 as a function of time if the voltage 1136 is equal to the voltage 1120, and the waveform 1320 represents the voltage 1232 as a function of time if the voltage 1136 is equal to the voltage 1151.

As shown in FIG. 13, $V_t$ (off) represents the predetermined threshold voltage 1151, $V_{t1}$ (off) represents a predetermined threshold voltage 1120, and $V_t$ (dccm) represents the predetermined threshold voltage 1121 according to certain embodiments. As an example, the predetermined threshold voltage 1120 (e.g., $V_{t1}$ (off)) is smaller than the predetermined threshold voltage 1151 (e.g., $V_t$ (off)). For example, the predetermined threshold voltage 1120 (e.g., $V_{t1}$ (off)) is equal to −60 mV, and the predetermined threshold voltage 1151 (e.g., $V_t$ (off)) is equal to −20 mV.

According to some embodiments, the predetermined threshold voltage 1121 (e.g., $V_t$ (dccm)) is used to compare with the voltage 1134, which is equal to the voltage 1232 if the transistor 1230 is turned on by the supply voltage 1214. In certain examples, when the transistor 1230 is turned on, if the predetermined threshold voltage 1121 (e.g., $V_t$ (dccm)) is smaller than the voltage 1134, scenario A is implemented, wherein the voltage 1136 is equal to the voltage 1120. In some examples, the waveform 1310 represents the voltage 1232 as a function of time under scenario A. For example, as shown by the waveform 1310 (e.g., in the deep continuous conduction mode (DCCM)), the synchronous rectification system (e.g., the synchronous rectifier) is turned off if the voltage 1232 becomes larger than the predetermined threshold voltage 1120 (e.g., $V_{t1}$ (off)). As an example, in the deep continuous conduction mode (DCCM), the voltage 1136 is equal to the voltage 1120 (e.g., $V_{t1}$ (off)), which is smaller than the predetermined threshold voltage 1151 (e.g., $V_t$ (off)). For example, if the voltage 1136 is equal to the voltage 1120 (e.g., $V_{t1}$ (off)), the synchronous rectification system (e.g., the synchronous rectifier) can be turned off earlier, by some time (e.g., ranging from several nanoseconds to less than twenty nanoseconds), than if the voltage 1136 is equal to the predetermined threshold voltage 1151 (e.g., $V_t$ (off)), in order to significantly reduce the spike of the voltage 1232.

In certain examples, when the transistor 1230 is turned on, if the predetermined threshold voltage 1121 (e.g., $V_t$ (dccm)) is larger than the voltage 1134, scenario B is implemented, wherein the voltage 1136 is equal to the voltage 1151. As an example, the waveform 1320 represents the voltage 1232 as a function of time under scenario B. For example, as shown by the waveform 1320, the synchronous rectification system (e.g., the synchronous rectifier) is turned off if the voltage 1232 becomes larger than the predetermined threshold voltage 1151 (e.g., $V_t$ (off)).

As discussed above and further emphasized here, FIG. 11 is merely an example, which should not unduly limit the scope of the claims. One of ordinary skill in the art would recognize many variations, alternatives, and modifications. For example, the comparator 1140 receives the supply voltage 1214 (e.g., AVDD), and the comparator 1140 also includes one or more components that use the received supply voltage 1214 (e.g., AVDD) to generate the predetermined threshold voltage 1121 (e.g., $V_t$ (dccm)) as shown in FIG. 14.

Figure 14:
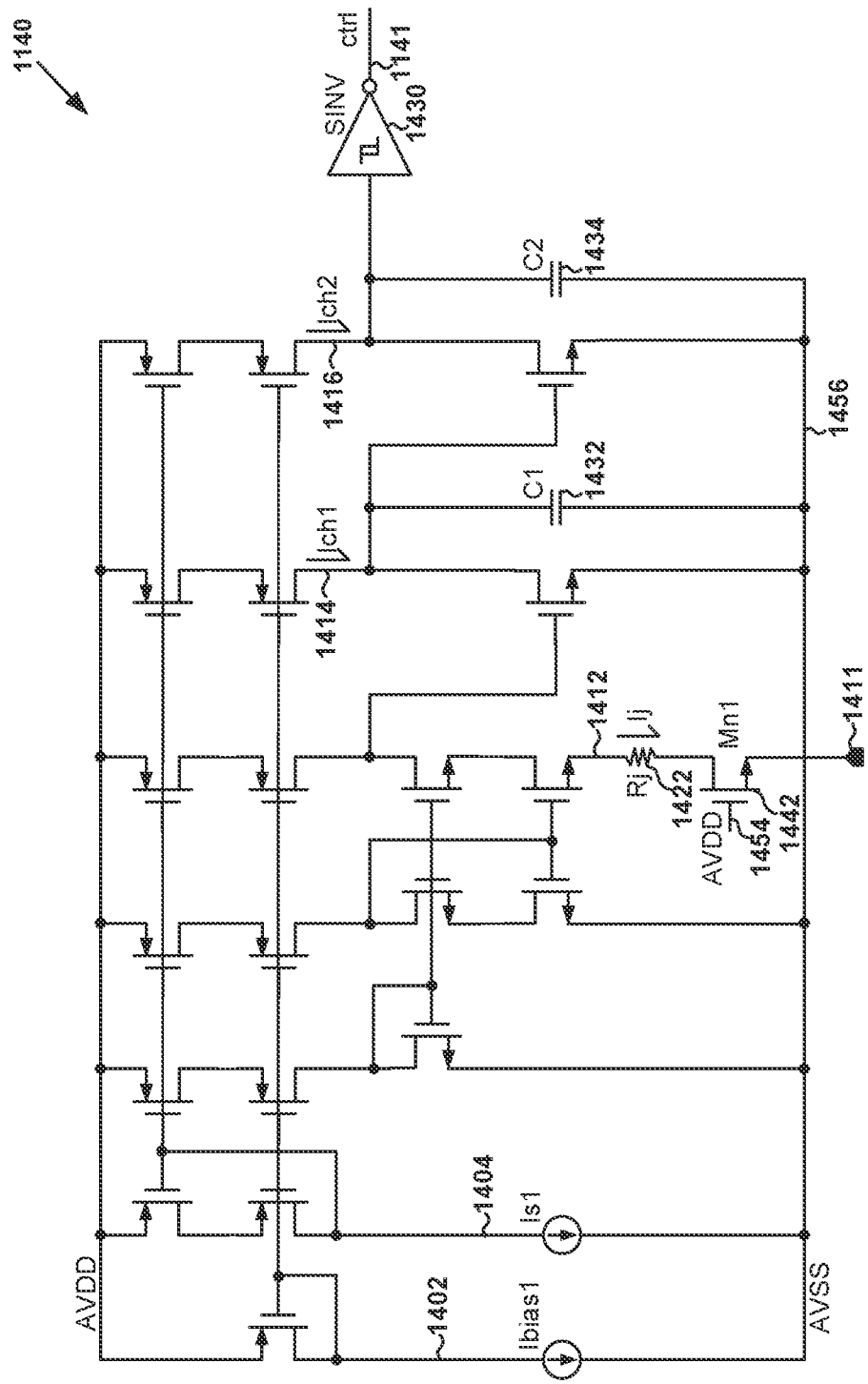
FIG. 14 is a simplified diagram showing the comparator as part of the turn-off control component as shown in FIG. 11 according to certain embodiments of the present invention.

FIG. 14 is a simplified diagram showing the comparator 1140 as part of the turn-off control component 1170 as shown in FIG. 11 according to certain embodiments of the present invention. This diagram is merely an example, which should not unduly limit the scope of the claims. One of ordinary skill in the art would recognize many variations, alternatives, and modifications. As shown in FIG. 14, the comparator 1140 includes a resistor 1422, capacitors 1432 and 1434, a transistor 1442 (e.g., a high-voltage transistor), and a Schmitt inverter 1430 according to some embodiments. For example, a voltage 1454 is the same as the supply voltage 1214 (e.g., AVDD), and a voltage 1456 is the same as the ground voltage received by the terminal 1268 (e.g., GND). As an example, currents 1402 and 1404 are bias currents, and currents 1412, 1414, and 1406 are also shown in FIG. 14.

In some examples, a terminal 1411 receives the voltage 1134, and the Schmitt inverter 1430 outputs the comparison signal 1141. For example, the gate terminal of the transistor 1442 receives the voltage 1454 and another terminal of the transistor 1442 receives the voltage 1134 through the terminal 1141. As an example, the transistor 1442 is turned on if the voltage 1134 is smaller than the supply voltage 1454 minus the threshold voltage of the transistor 1442.

In certain examples, the predetermined threshold voltage 1121 is determined as follows:

$$V_t(dccm) = -R_j \times I_j \quad \text{(Equation 8)}$$

where $V_t$ (dccm) represents the predetermined threshold voltage 1121, $R_j$ represents the resistance of the resistor 1422, and $I_j$ represents the magnitude of the current 1412.

In some embodiments, the current 1414 charges the capacitor 1432 and causes the delay for the rising edge of the comparison signal 1141. For example, the delay for the rising edge of the comparison signal 1141 is 500 nanoseconds. In certain embodiments, the current 1416 charges the capacitor 1434 and causes the delay for the falling edge of the comparison signal 1141. For example, the delay for the falling edge of the comparison signal 1141 is 150 nanoseconds.

As discussed above and further emphasized here, FIG. 11 is merely an example, which should not unduly limit the scope of the claims. One of ordinary skill in the art would recognize many variations, alternatives, and modifications. For example, the comparator 1150 receives the supply voltage 1214 (e.g., AVDD), and the comparator 1150 also includes one or more components that use the received supply voltage 1214 (e.g., AVDD) to generate the predetermined threshold voltage 1151 (e.g., $V_t$ (off)) and the predetermined threshold voltage 1120 (e.g., $V_{t1}$ (off)) as shown in FIG. 15.

Figure 15:
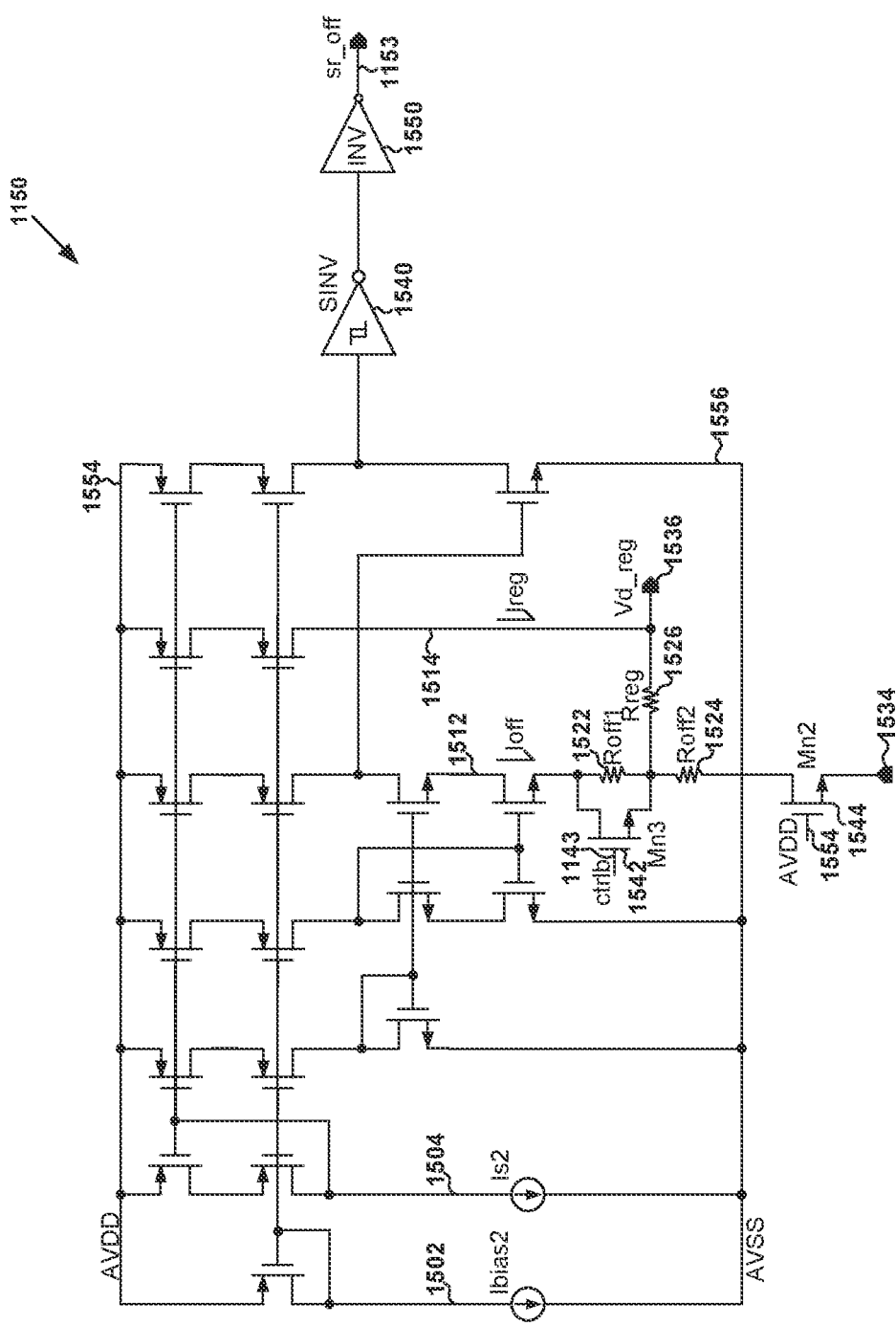
FIG. 15 is a simplified diagram showing the comparator as part of the turn-off control component as shown in FIG. 11 according to some embodiments of the present invention.

FIG. 15 is a simplified diagram showing the comparator 1150 as part of the turn-off control component 1170 as shown in FIG. 11 according to some embodiments of the present invention. This diagram is merely an example, which should not unduly limit the scope of the claims. One of ordinary skill in the art would recognize many variations, alternatives, and modifications. As shown in FIG. 15, the comparator 1150 includes resistors 1522, 1524 and 1526, a transistor 1542 (e.g., a low-voltage transistor), a transistor 1544 (e.g., a high-voltage transistor), a Schmitt inverter 1540, and an inverter 1550 (e.g., a NOT gate) according to some embodiments. For example, a voltage 1554 is the same as the supply voltage 1214 (e.g., AVDD), and a voltage 1556 is the same as the ground voltage received by the terminal 1268 (e.g., GND). As an example, currents 1502 and 1504 are bias currents, and currents 1512 and 1514 are also shown in FIG. 15.

According to certain embodiments, a terminal 1534 receives the voltage 1134, and the inverter 1550 (e.g., a NOT gate) outputs the comparison signal 1153 (e.g., sr_off). For example, the Schmitt inverter 1540 and the inverter 1550 (e.g., a NOT gate) are in series. In some examples, the gate terminal of the transistor 1542 (e.g., a low-voltage transistor) receives the signal 1143 (e.g., ctrlb). For example, if the signal 1143 (e.g., ctrlb) is at the logic high level, the transistor 1542 is turned on. As an example, if the signal 1143 (e.g., ctrlb) is at the logic low level, the transistor 1542 is turned off. In certain examples, the gate terminal of the transistor 1544 receives the voltage 1554 and another terminal of the transistor 1544 receives the voltage 1134 through the terminal 1534. As an example, the transistor 1544 is turned on if the voltage 1134 is smaller than the supply voltage 1554 minus the threshold voltage of the transistor 1544.

In some examples, the predetermined threshold voltage 1151 is determined as follows:

$$V_t(off) = -R_{off2} \times I_{off} \quad \text{(Equation 9)}$$

where $V_t$ (off) represents the predetermined threshold voltage 1151, $R_{off2}$ represents the resistance of the resistor 1524, and $I_{off}$ represents the magnitude of the current 1512.

In certain examples, the predetermined threshold voltage 1120 (e.g., $V_{t1}$ (off))

$$V_{t1}(off) = -(R_{off1} + R_{off2}) \times I_{off} \quad \text{(Equation 10)}$$

where $V_{t1}$ (off) represents the predetermined threshold voltage 1120, $R_{off1}$ represents the resistance of the resistor 1522, $R_{off2}$ represents the resistance of the resistor 1524, and $I_{off}$ represents the magnitude of the current 1512.

In certain embodiments, a terminal 1536 is biased to a voltage as follows:

$$V_t(reg) = -(R_{off2} \times (I_{off} + I_{reg}) + R_{reg} \times I_{reg}) \quad \text{(Equation 11)}$$

where $V_t$ (reg) represents the voltage to which the terminal 1536 is biased. Additionally, $R_{off2}$ represents the resistance of the resistor 1524, $I_{off}$ represents the magnitude of the current 1512, and $I_{reg}$ represents the magnitude of the current 1514. Also, $R_{reg}$ represents the resistance of the resistor 1526.

Figure 16:
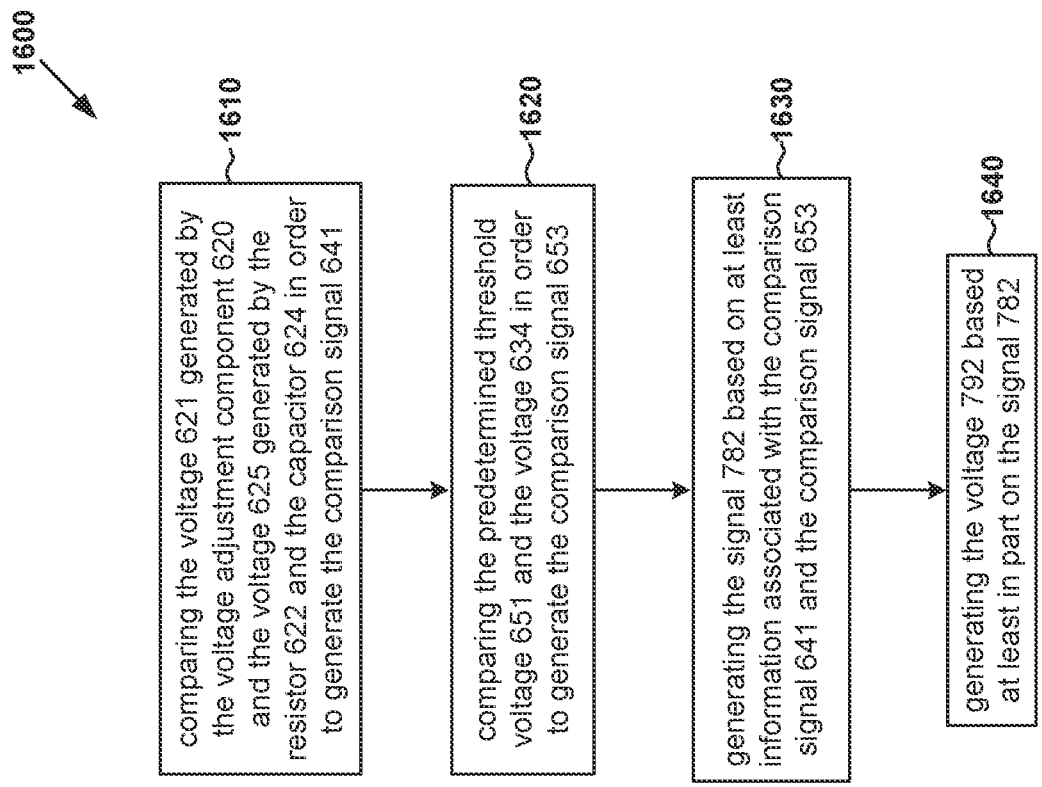
FIG. 16 is a simplified diagram showing a method for the controller for synchronous rectification including the turn-off control component as shown in FIG. 6 and FIG. 7 according to certain embodiments of the present invention.

FIG. 16 is a simplified diagram showing a method for the controller 760 for synchronous rectification including the turn-off control component 670 as shown in FIG. 6 and FIG. 7 according to certain embodiments of the present invention. This diagram is merely an example, which should not unduly limit the scope of the claims. One of ordinary skill in the art would recognize many variations, alternatives, and modifications. The method 1600 includes a process 1610 for comparing the voltage 621 generated by the voltage adjustment component 620 and the voltage 625 generated by the resistor 622 and the capacitor 624 in order to generate the comparison signal 641, a process 1620 for comparing the predetermined threshold voltage 651 and the voltage 634 in order to generate the comparison signal 653, a process 1630 for generating the signal 782 based on at least information associated with the comparison signal 641 and the comparison signal 653, and a process 1640 for generating the voltage 792 based at least in part on the signal 782. Although the above has been shown using a selected group of processes for the method 1600, there can be many alternatives, modifications, and variations. For example, some of the processes may be expanded and/or combined. Other processes may be inserted to those noted above. Depending upon the embodiment, the arrangement of processes may be interchanged with others replaced. Further details of these processes are found throughout the present specification.

At the process 1610, the voltage 621 generated by the voltage adjustment component 620 and the voltage 625 generated by the resistor 622 and the capacitor 624 are compared by the comparator 640, which generates the comparison signal 641 based at least in part on the voltage 621 and the voltage 625 according to some embodiments. For example, the voltage adjustment component 620 receives the voltage 611 and generates the voltage 621 based at least in part on the voltage 611. As an example, the RC filter circuit including the resistor 622 and the capacitor 624 receives the voltage 611 and generates the voltage 625 based at least in part on the voltage 611.

According to certain embodiments, the comparison signal 641 indicates the rising slope of the voltage 611. For example, the voltage 611 is equal to the voltage 634 (e.g., the voltage 734) if the switch 610 is closed. As an example, the voltage 634 (e.g., the voltage 734) is equal to the voltage 732 if the transistor 730 is turned on by the supply voltage 714. In some examples, if the transistor 730 is turned on and the switch 610 is closed, the voltage 611 is equal to the voltage 732. In certain examples, if the transistor 730 is turned on and the switch 610 is closed, the comparison signal 641 indicates the rising slope of the voltage 732.

At the process 1620, the predetermined threshold voltage 651 (e.g., $V_t$ (off)) and the voltage 634 are compared by the comparator 650, which generates the comparison signal 653 (e.g., sr_off) based at least in part on the predetermined threshold voltage 651 (e.g., $V_t$ (off)) and the voltage 634 according to certain embodiments. For example, the comparator 650 outputs the comparison signal 653 (e.g., sr_off) to the AND gate 660.

At the process 1630, the signal 782 is generated by the flip-flop 780 based on at least information associated with the comparison signal 641 and the comparison signal 653 according to some embodiments. For example, the comparison signal 641 is received by the inverter 642 (e.g., a NOT gate), which generates the signal 643 (e.g., sr_off_slope) based at least in part on the comparison signal 641. As an example, the AND gate 660 receives the signal 643 (e.g., sr_off_slope) and the comparison signal 653 (e.g., sr_off) and generates the signal 661 based at least in part on the comparison signal 653 (e.g., sr_off) and the signal 643 (e.g., sr_off_slope). In some examples, the signal 661 (e.g., the signal 772) is received by the NOR gate 774, which generates the signal 776 based at least in part on the signal 661 (e.g., the signal 772). In certain examples, the signal 776 is received by the flip-flop 780, which generates the signal 782 (e.g., sr) based at least in part on the signal 776. According to certain embodiments, the signal 782 (e.g., the signal 682) is received by the switch 610 (e.g., a transistor) to close or open the switch 610.

At the process 1640, the voltage 792 is generated by the driver 790 based at least in part on the signal 782 according to certain embodiments. In some examples, if the signal 782 (e.g., sr) is at the logic high level, the voltage 792 is at the high voltage level, and if the signal 782 (e.g., sr) is at the logic low level, the voltage 792 is at the low voltage level. For example, if the voltage 792 is at the high voltage level, the synchronous rectification system (e.g., the synchronous rectifier) that includes the controller 760 for synchronous rectification is turned on. As an example, if the voltage 792 is at the low voltage level, the synchronous rectification system (e.g., the synchronous rectifier) that includes the controller 760 for synchronous rectification is turned off.

Figure 17:
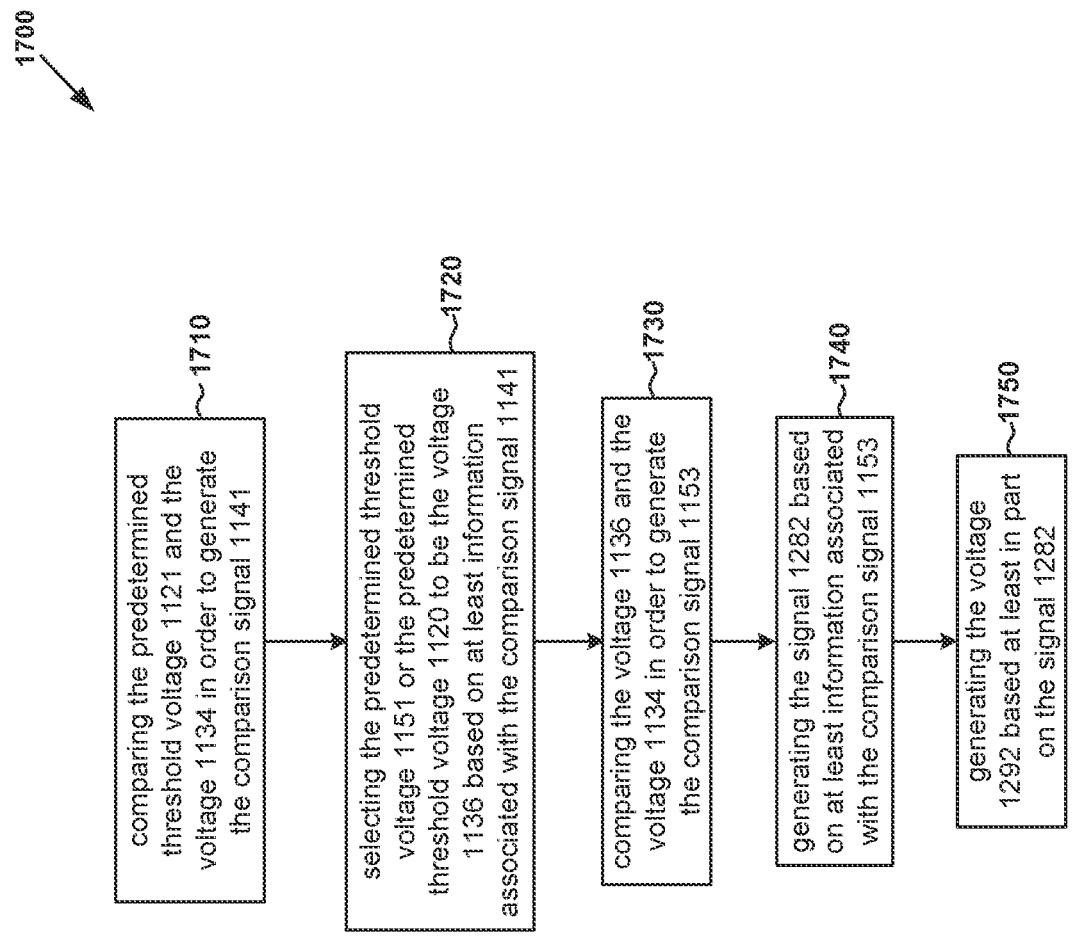
FIG. 17 is a simplified diagram showing a method for the controller for synchronous rectification including the turn-off control component as shown in FIG. 11 and FIG. 12 according to some embodiments of the present invention.

FIG. 17 is a simplified diagram showing a method for the controller 1260 for synchronous rectification including the turn-off control component 1170 as shown in FIG. 11 and FIG. 12 according to some embodiments of the present invention. This diagram is merely an example, which should not unduly limit the scope of the claims. One of ordinary skill in the art would recognize many variations, alternatives, and modifications. The method 1700 includes a process 1710 for comparing the predetermined threshold voltage 1121 and the voltage 1134 in order to generate the comparison signal 1141, a process 1720 for selecting the predetermined threshold voltage 1151 or the predetermined threshold voltage 1120 to be the voltage 1136 based on at least information associated with the comparison signal 1141, a process 1730 for comparing the voltage 1136 and the voltage 1134 in order to generate the comparison signal 1153, a process 1740 for generating the signal 1282 based on at least information associated with the comparison signal 1153, and a process 1750 for generating the voltage 1292 based at least in part on the signal 1282. Although the above has been shown using a selected group of processes for the method 1700, there can be many alternatives, modifications, and variations. For example, some of the processes may be expanded and/or combined. Other processes may be inserted to those noted above. Depending upon the embodiment, the arrangement of processes may be interchanged with others replaced. Further details of these processes are found throughout the present specification.

At the process 1710, the predetermined threshold voltage 1121 and the voltage 1134 are compared by the comparator 1140 in order to generate the comparison signal 1141 based at least in part on the predetermined threshold voltage 1121 and the voltage 1134 according to certain embodiments. For example, the voltage 1134 (e.g., the voltage 1234) is equal to the voltage 1232 if the transistor 1230 is turned on by the supply voltage 1214. As an example, the comparison signal 1141 (e.g., ctrl) is received by the inverter 1160 (e.g., a NOT gate), which generates the signal 1143 (e.g., ctrlb) based at least in part on the comparison signal 1141 (e.g., ctrl).

At the process 1720, either the predetermined threshold voltage 1151 or the predetermined threshold voltage 1120 is selected to be the voltage 1136 based on at least information associated with the comparison signal 1141 according to some embodiments. In certain examples, if the predetermined threshold voltage 1121 is lower than the voltage 1134, the predetermined threshold voltage 1151 is selected to be the voltage 1136. In some examples, if the predetermined threshold voltage 1121 is higher than the voltage 1134, the predetermined threshold voltage 1120 is selected to be the voltage 1136.

At the process 1730, the voltage 1136 and the voltage 1134 are compared by the comparator 1150 in order to generate the comparison signal 1153 based at least in part on the voltage 1136 and the voltage 1134 according to certain embodiments. In some examples, if the predetermined threshold voltage 1151 (e.g., $V_t$ (off)) is selected to be the voltage 1136, the comparator 1150 compares the predetermined threshold voltage 1151 (e.g., $V_t$ (off)) and the voltage 1134 and generates the comparison signal 1153 based at least in part on the predetermined threshold voltage 1151 (e.g., $V_t$ (off)) and the voltage 1134. In certain examples, if the predetermined threshold voltage 1120 (e.g., $V_{t1}$ (off)) is selected to be the voltage 1136, the comparator 1150 compares the predetermined threshold voltage 1120 (e.g., $V_{t1}$ (off)) and the voltage 1134 and generates the comparison signal 1153 based at least in part on the predetermined threshold voltage 1120 (e.g., $V_{t1}$ (off)) and the voltage 1134.

At the process 1740, the signal 1282 is generated by the flip-flop 1280 based on at least information associated with the comparison signal 1153 according to some embodiments. For example, the signal 1153 (e.g., the signal 1272) is received by the NOR gate 1274, which generates the signal 1276 based at least in part on the signal 1153 (e.g., the signal 1272). As an example, the signal 1276 is received by the flip-flop 1280, which generates the signal 1282 (e.g., sr) based at least in part on the signal 1276.

At the process 1750, the voltage 1292 is generated by the driver 1290 based at least in part on the signal 1282 according to certain embodiments. In some examples, if the signal 1282 (e.g., sr) is at the logic high level, the voltage 1292 is at the high voltage level, and if the signal 1282 (e.g., sr) is at the logic low level, the voltage 1292 is at the low voltage level. For example, if the voltage 1292 is at the high voltage level, the synchronous rectification system (e.g., the synchronous rectifier) that includes the controller 760 for synchronous rectification is turned on. As an example, if the voltage 1292 is at the low voltage level, the synchronous rectification system (e.g., the synchronous rectifier) that includes the controller 760 for synchronous rectification is turned off.

According to certain embodiments, a system and method is provided for fast turning-off of the synchronous rectification system (e.g., the synchronous rectifier). In some examples, for a transistor on the secondary side, when the voltage drop between the drain terminal and the source terminal is detected to have a large rising slope, the synchronous rectification system (e.g., the synchronous rectifier) is turned off immediately. In certain examples, for a transistor on the secondary side, when the voltage drop between the drain terminal and the source terminal is detected to be low, a lower threshold voltage is selected for turning off the synchronous rectification system (e.g., the synchronous rectifier) so that the synchronous rectification system (e.g., the synchronous rectifier) can be turned off earlier than if a higher threshold voltage is used. According to some embodiments, a system and method is provided to shorten the time for turning off the synchronous rectification system (e.g., the synchronous rectifier). For example, for a transistor on the secondary side, the spike of the voltage drop between the drain terminal and the source terminal is significantly reduced in the deep continuous conduction mode (DCCM). As an example, the efficiency and reliability of the synchronous rectification system (e.g., the synchronous rectifier) is improved.

According to some embodiments, a system for controlling synchronous rectification includes: a switch including a first switch terminal configured to receive a first voltage, the switch further including a second switch terminal and being configured to be closed or opened by a control signal; a voltage generator configured to receive a second voltage from the second switch terminal and generate a third voltage based at least in part on the second voltage; a filter circuit including a resistor and a capacitor, the filter circuit being configured to receive the second voltage from the second switch terminal and generate a fourth voltage based at least in part on the second voltage; a first comparator configured to receive the third voltage and the fourth voltage and generate a first comparison signal based at least in part on the third voltage and the four voltage; a second comparator configured to receive a predetermined threshold voltage and the first voltage and generate a second comparison signal based at least in part on the predetermined threshold voltage and the first voltage; and a signal generator configured to generate the control signal based on at least information associated with the first comparison signal and the second comparison signal. For example, the system for controlling synchronous rectification is implemented according to at least FIG. 6 and/or FIG. 7.

In certain examples, the second voltage is equal to the first voltage if the switch is closed by the control signal. In some examples, the second voltage minus the third voltage is equal to a predetermined offset voltage. In certain examples, the system further includes a NOT gate configured to receive the first comparison signal and generate a first logic signal based at least in part on the first comparison signal. In some examples, the signal generator is further configured to generate the control signal based on at least information associated with the first logic signal and the second comparison signal.

In certain examples, the system further includes an AND gate configured to receive the first logic signal and the second comparison signal and generate a second logic signal based at least in part on the first logic signal and the second comparison signal. In some examples, the signal generator is further configured to receive the second logic signal and generate the control signal based at least in part on the second logic signal. In certain examples, the signal generator includes: a NOR gate configured to receive the second logic signal and generate a third logic signal based at least in part on the second logic signal; and a flip-flop configured to receive the third logic signal and generate the control signal based at least in part on the third logic signal.

In some examples, the system further includes a driver configured to receive the control signal from the signal generator and generate a drive voltage based at least in part on the control signal. In certain examples, the resistor including a first resistor terminal and a second resistor terminal, the first resistor terminal being configured to receive the second voltage from the second switch terminal; the capacitor including a first capacitor terminal and a second capacitor terminal, the first capacitor terminal being connected to the second resistor terminal; and the first comparator is configured to receive the fourth voltage from the first capacitor terminal and the second resistor terminal. In some examples, the second capacitor terminal is biased to a ground voltage. In certain examples, the switch is configured to: be closed if the control signal is at a logic high level; and be open if the control signal is at a logic low level. In some examples, the switch includes a transistor including a gate terminal configured to receive the control signal.

According to certain embodiments, a system for controlling synchronous rectification includes: a first comparator configured to receive a first threshold voltage and an input voltage and generate a first comparison signal based at least in part on the first threshold voltage and the input voltage; a voltage selector configured to receive a second threshold voltage and a third threshold voltage, select the second threshold voltage or the third threshold voltage based on at least information associated with the first comparison signal, output the selected second threshold voltage or the selected third threshold voltage as an output voltage; a second comparator configured to receive the output voltage and the input voltage and generate a second comparison signal based at least in part on the output voltage and the input voltage, the output voltage being either the selected second threshold voltage or the selected third threshold voltage; and a signal generator configured to generate a control signal based on at least information associated with the second comparison signal; wherein the voltage selector is further configured to: select the second threshold voltage as the output voltage if the first threshold voltage is smaller than the input voltage; and select the third threshold voltage as the output voltage if the first threshold voltage is larger than the input voltage; wherein the second threshold voltage is larger than the third threshold voltage. For example, the system for controlling synchronous rectification is implemented according to at least FIG. 11 and/or FIG. 12.

In some examples, the second threshold voltage is larger than the first threshold voltage; and the third threshold voltage is larger than the first threshold voltage. In certain examples, the voltage selector includes a first switch and a second switch; the first switch is configured to be closed or opened based on at least information associated with the first comparison signal; and the second switch is configured to be closed or opened based on at least information associated with the first comparison signal. In some examples, the voltage selector is further configured to: select the second threshold voltage as the output voltage if the first switch is closed and the second switch is open; and select the third threshold voltage as the output voltage if the first switch is open and the second switch is closed.

In certain examples, the system further includes a NOT gate configured to receive the first comparison signal and generate a first logic signal based at least in part on the first comparison signal. In some examples, the voltage selector is further configured to select the second threshold voltage or the third threshold voltage based at least in part on the first comparison signal and the first logic signal. In certain examples, the voltage selector includes a first switch and a second switch; the first switch is configured to be closed or opened based at least in part on the first logic signal; and the second switch is configured to be closed or opened based at least in part on the first comparison signal.

In some examples, the signal generator includes: a NOR gate configured to receive the second comparison signal and generate a second logic signal based at least in part on the second comparison signal; and a flip-flop configured to receive the second logic signal and generate the control signal based at least in part on the second logic signal. In certain examples, the system further includes a driver configured to receive the control signal from the signal generator and generate a drive voltage based at least in part on the control signal.

According to some embodiments, a method for controlling synchronous rectification includes: receiving a first voltage by a first switch terminal of a switch, the switch further including a second switch terminal and being configured to be closed or opened by a control signal; receiving a second voltage from the second switch terminal; generating a third voltage based at least in part on the second voltage by the voltage generator; generating a fourth voltage based at least in part on the second voltage by a filter circuit including a resistor and a capacitor; receiving the third voltage and the fourth voltage; generating a first comparison signal based at least in part on the third voltage and the four voltage; receiving a predetermined threshold voltage and the first voltage; generating a second comparison signal based at least in part on the predetermined threshold voltage and the first voltage; and generating the control signal based on at least information associated with the first comparison signal and the second comparison signal. For example, the method for controlling synchronous rectification is implemented according to at least FIG. 6 and/or FIG. 7.

According to certain embodiments, a method for controlling synchronous rectification includes: receiving a first threshold voltage and an input voltage; generating a first comparison signal based at least in part on the first threshold voltage and the input voltage; receiving a second threshold voltage and a third threshold voltage; selecting the second threshold voltage or the third threshold voltage based on at least information associated with the first comparison signal; outputting the selected second threshold voltage or the selected third threshold voltage as an output voltage; receiving the output voltage and the input voltage, the output voltage being either the selected second threshold voltage or the selected third threshold voltage; generating a second comparison signal based at least in part on the output voltage and the input voltage; and generating a control signal based on at least information associated with the second comparison signal; wherein the selecting the second threshold voltage or the third threshold voltage based on at least information associated with the first comparison signal includes: selecting the second threshold voltage as the output voltage if the first threshold voltage is smaller than the input voltage; and selecting the third threshold voltage as the output voltage if the first threshold voltage is larger than the input voltage; wherein the second threshold voltage is larger than the third threshold voltage. For example, the method for controlling synchronous rectification is implemented according to at least FIG. 11 and/or FIG. 12.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for controlling synchronous rectification, the system comprising:
    a switch including a first switch terminal configured to receive a first voltage, the switch further including a second switch terminal and being configured to be closed or opened by a control signal;
    a voltage generator configured to receive a second voltage from the second switch terminal and generate a third voltage based at least in part on the second voltage;
    a filter circuit including a resistor and a capacitor, the filter circuit being configured to receive the second voltage from the second switch terminal and generate a fourth voltage based at least in part on the second voltage;
    a first comparator configured to receive the third voltage and the fourth voltage and generate a first comparison signal based at least in part on the third voltage and the four voltage;
    a second comparator configured to receive a predetermined threshold voltage and the first voltage and generate a second comparison signal based at least in part on the predetermined threshold voltage and the first voltage; and
    a signal generator configured to generate the control signal based on at least information associated with the first comparison signal and the second comparison signal.

2. The system of claim 1 wherein the second voltage is equal to the first voltage if the switch is closed by the control signal.

3. The system of claim 1 wherein the second voltage minus the third voltage is equal to a predetermined offset voltage.

4. The system of claim 1, and further comprising a NOT gate configured to receive the first comparison signal and generate a first logic signal based at least in part on the first comparison signal.

5. The system of claim 4 wherein the signal generator is further configured to generate the control signal based on at least information associated with the first logic signal and the second comparison signal.

6. The system of claim 4, and further comprising an AND gate configured to receive the first logic signal and the second comparison signal and generate a second logic signal based at least in part on the first logic signal and the second comparison signal.

7. The system of claim 6 wherein the signal generator is further configured to receive the second logic signal and generate the control signal based at least in part on the second logic signal.

8. The system of claim 7 wherein the signal generator includes:
a NOR gate configured to receive the second logic signal and generate a third logic signal based at least in part on the second logic signal; and
a flip-flop configured to receive the third logic signal and generate the control signal based at least in part on the third logic signal.

9. The system of claim 1, and further comprising a driver configured to receive the control signal from the signal generator and generate a drive voltage based at least in part on the control signal.

10. The system of claim 1 wherein:
the resistor including a first resistor terminal and a second resistor terminal, the first resistor terminal being configured to receive the second voltage from the second switch terminal;
the capacitor including a first capacitor terminal and a second capacitor terminal, the first capacitor terminal being connected to the second resistor terminal; and
the first comparator is configured to receive the fourth voltage from the first capacitor terminal and the second resistor terminal.

11. The system of claim 10 wherein the second capacitor terminal is biased to a ground voltage.

12. The system of claim 1 wherein the switch is configured to:
be closed if the control signal is at a logic high level;
be open if the control signal is at a logic low level.

13. The system of claim 1 wherein the switch includes a transistor including a gate terminal configured to receive the control signal.

14. A system for controlling synchronous rectification, the system comprising:
a first comparator configured to receive a first threshold voltage and an input voltage and generate a first comparison signal based at least in part on the first threshold voltage and the input voltage;
a voltage selector configured to receive a second threshold voltage and a third threshold voltage, select the second threshold voltage or the third threshold voltage based on at least information associated with the first comparison signal, output the selected second threshold voltage or the selected third threshold voltage as an output voltage;
a second comparator configured to receive the output voltage and the input voltage and generate a second comparison signal based at least in part on the output voltage and the input voltage, the output voltage being either the selected second threshold voltage or the selected third threshold voltage; and
a signal generator configured to generate a control signal based on at least information associated with the second comparison signal;
wherein the voltage selector is further configured to:
select the second threshold voltage as the output voltage if the first threshold voltage is smaller than the input voltage; and
select the third threshold voltage as the output voltage if the first threshold voltage is larger than the input voltage;
wherein the second threshold voltage is larger than the third threshold voltage.

15. The system of claim 14 wherein:
the second threshold voltage is larger than the first threshold voltage; and
the third threshold voltage is larger than the first threshold voltage.

16. The system of claim 14 wherein:
the voltage selector includes a first switch and a second switch;
the first switch is configured to be closed or opened based on at least information associated with the first comparison signal; and
the second switch is configured to be closed or opened based on at least information associated with the first comparison signal.

17. The system of claim 16 wherein the voltage selector is further configured to:
select the second threshold voltage as the output voltage if the first switch is closed and the second switch is open; and
select the third threshold voltage as the output voltage if the first switch is open and the second switch is closed.

18. The system of claim 14, and further comprising a NOT gate configured to receive the first comparison signal and generate a first logic signal based at least in part on the first comparison signal.

19. The system of claim 18 wherein the voltage selector is further configured to select the second threshold voltage or the third threshold voltage based at least in part on the first comparison signal and the first logic signal.

20. The system of claim 19 wherein:
the voltage selector includes a first switch and a second switch;
the first switch is configured to be closed or opened based at least in part on the first logic signal; and
the second switch is configured to be closed or opened based at least in part on the first comparison signal.

21. The system of claim 14 wherein the signal generator includes:
a NOR gate configured to receive the second comparison signal and generate a second logic signal based at least in part on the second comparison signal; and
a flip-flop configured to receive the second logic signal and generate the control signal based at least in part on the second logic signal.

22. The system of claim 14, and further comprising a driver configured to receive the control signal from the signal generator and generate a drive voltage based at least in part on the control signal.

23. A method for controlling synchronous rectification, the method comprising:
- receiving a first voltage by a first switch terminal of a switch, the switch further including a second switch terminal and being configured to be closed or opened by a control signal;
- receiving a second voltage from the second switch terminal;
- generating a third voltage based at least in part on the second voltage by the voltage generator;
- generating a fourth voltage based at least in part on the second voltage by a filter circuit including a resistor and a capacitor;
- receiving the third voltage and the fourth voltage;
- generating a first comparison signal based at least in part on the third voltage and the four voltage;
- receiving a predetermined threshold voltage and the first voltage;
- generating a second comparison signal based at least in part on the predetermined threshold voltage and the first voltage; and
- generating the control signal based on at least information associated with the first comparison signal and the second comparison signal.

24. A method for controlling synchronous rectification, the method comprising:
- receiving a first threshold voltage and an input voltage;
- generating a first comparison signal based at least in part on the first threshold voltage and the input voltage;
- receiving a second threshold voltage and a third threshold voltage;
- selecting the second threshold voltage or the third threshold voltage based on at least information associated with the first comparison signal;
- outputting the selected second threshold voltage or the selected third threshold voltage as an output voltage;
- receiving the output voltage and the input voltage, the output voltage being either the selected second threshold voltage or the selected third threshold voltage;
- generating a second comparison signal based at least in part on the output voltage and the input voltage; and
- generating a control signal based on at least information associated with the second comparison signal;
- wherein the selecting the second threshold voltage or the third threshold voltage based on at least information associated with the first comparison signal includes:
  - selecting the second threshold voltage as the output voltage if the first threshold voltage is smaller than the input voltage; and
  - selecting the third threshold voltage as the output voltage if the first threshold voltage is larger than the input voltage;
- wherein the second threshold voltage is larger than the third threshold voltage.

* * * * *